US010558271B2

(12) United States Patent
Wakuda et al.

(10) Patent No.: US 10,558,271 B2
(45) Date of Patent: *Feb. 11, 2020

(54) SYSTEM FOR RECEIVING INPUT IN RESPONSE TO MOTION OF USER

(71) Applicant: Panasonic Intellectual Property Management Co., Ltd., Osaka (JP)

(72) Inventors: Daisuke Wakuda, Kyoto (JP); Kenichi Ezaki, Osaka (JP); Takashi Matsumoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/417,291

(22) Filed: Jan. 27, 2017

(65) Prior Publication Data
US 2017/0269698 A1    Sep. 21, 2017

(30) Foreign Application Priority Data

Mar. 18, 2016   (JP) .................................. 2016-055635

(51) Int. Cl.
*G06F 3/01*    (2006.01)
*G06F 3/00*    (2006.01)
(Continued)

(52) U.S. Cl.
CPC .............. *G06F 3/017* (2013.01); *B60K 35/00* (2013.01); *B60K 37/06* (2013.01); *B62D 15/021* (2013.01);
(Continued)

(58) Field of Classification Search
CPC combination set(s) only.
See application file for complete search history.

(56) References Cited

U.S. PATENT DOCUMENTS

2008/0211832 A1*  9/2008  Kumon .................. B60K 35/00
                                                                345/641
2010/0103132 A1*  4/2010  Ikeda .................. G06F 3/04883
                                                                345/173
(Continued)

FOREIGN PATENT DOCUMENTS

DE    10201420489      9/2015
DE    102014204289     9/2015
(Continued)

OTHER PUBLICATIONS

Communication pursuant to Article 94(3) EPC dated Dec. 11, 2019 in European Patent Application No. 17153775.6.
(Continued)

*Primary Examiner* — Temesghen Ghebretinsae
*Assistant Examiner* — Sosina Abebe
(74) *Attorney, Agent, or Firm* — Wenderoth, Lind & Ponack, L.L.P.

(57) ABSTRACT

A system includes a sensor that detects motions of a first portion and a second portion of a body of a user, a controller that sets an association relationship between a coordinate system of a real space and a coordinate system of a virtual space in response to the motion of the first portion and receives an operation for an object in the virtual space in response to a position and the motion of the second portion, and a notification device that contactlessly notifies a third portion of the body of prescribed information.

20 Claims, 13 Drawing Sheets

(51) Int. Cl.
    *G06F 3/0481*      (2013.01)
    *B60K 35/00*      (2006.01)
    *B60K 37/06*      (2006.01)
    *B62D 15/02*      (2006.01)
    *G06F 3/0482*      (2013.01)
    *G02B 27/01*      (2006.01)
    *G06K 9/00*      (2006.01)

(52) U.S. Cl.
    CPC .............. *G06F 3/005* (2013.01); *G06F 3/011* (2013.01); *G06F 3/016* (2013.01); *G06F 3/0482* (2013.01); *G06F 3/04812* (2013.01); *B60K 2370/146* (2019.05); *B60K 2370/1464* (2019.05); *B60R 2300/205* (2013.01); *G02B 27/01* (2013.01); *G02B 2027/0187* (2013.01); *G06F 2203/014* (2013.01); *G06K 9/00355* (2013.01)

(56) References Cited

U.S. PATENT DOCUMENTS

| | | | |
|---|---|---|---|
| 2011/0279397 A1* | 11/2011 | Rimon | G06F 3/044 345/173 |
| 2014/0062866 A1 | 3/2014 | Yamashita | |
| 2015/0016777 A1* | 1/2015 | Abovitz | G02B 6/34 385/37 |
| 2015/0193197 A1 | 7/2015 | Nahman et al. | |
| 2017/0192629 A1* | 7/2017 | Takada | G06F 3/0482 |

FOREIGN PATENT DOCUMENTS

| | | |
|---|---|---|
| EP | 2040156 | 3/2009 |
| EP | 2 590 055 | 5/2013 |
| EP | 2 700 543 | 2/2014 |
| JP | 2004-345549 | 12/2004 |
| JP | 2005-063092 | 3/2005 |
| JP | 2005-254851 | 9/2005 |
| JP | 2014-048938 | 3/2014 |
| JP | 2015-143987 | 8/2015 |
| JP | 2016-018223 | 2/2016 |

OTHER PUBLICATIONS

Shane Hickey: "The Innovators—invisible buttons loom into view I Business I The Guardian", Oct. 25, 2015 (Oct. 25, 2015), XP055389853, Retrieved from the Internet: URL:https://www.theguardian.com/business/2015/oct/25/the-innovators-invisible-buttons-ultrahaptics [retrieved on Jul. 11, 2017].

Rajinder Sodhi et al: "Aireal", ACM Transactions on Graphics (TOG), Jul. 21, 2013 (Jul. 21, 2013), pp. 1-10, XP055367928, DOI: 10.1145/2461912.2462007 Retrieved from the Internet: URL:http://delivery.acm.org/10.1145/2470000/2462007/a134-sodhi.pdf?ip=145.64.254.240&id=2462007&acc=ACTIVESERVICE&key=E80E9EB78FFDF9DF.4D4702B0C3E38B35.4D4702B0C3E38B35.4D4702B0C3E38B35&CFID=929004018&CFTOKEN=27242526&_acm_=1493217760_5ee6fe2f32e73496f6c3d6fce76476ef.

Extended European Search Report dated Jul. 19, 2017 in corresponding European patent application No. 17153775.6.

\* cited by examiner

| | LOCAL COORDINATES IN VIRTUAL SPACE | GLOBAL COORDINATES IN REAL SPACE |
|---|---|---|
| HOME POSITION | (0, 0, 0) | (X1, Y1, Z1) |
| SELECTABLE PART A | (x2, y2, z2) | (X2, Y2, Z2) |
| SELECTABLE PART B | (x3, y3, z3) | (X3, Y3, Z3) |
| SELECTABLE PART C | (x4, y4, z4) | (X4, Y4, Z4) |
| SELECTABLE PART D | (x5, y5, z5) | (X5, Y5, Z5) |
| SELECTABLE PART E | (x6, y6, z6) | (X6, Y6, Z6) |

SYSTEM FOR RECEIVING INPUT IN RESPONSE TO MOTION OF USER

BACKGROUND

1. Technical Field

The present disclosure relates to a system and a method for receiving an input in response to a motion of a user.

2. Description of the Related Art

Japanese Unexamined Patent Application Publication No. 2004-345549 discloses a system in related art that receives an input from a user. The system includes a pointing device that includes an operation unit which is operated by a hand of a driver and a detection unit which detects the position of the hand of the driver and a display unit that displays plural icons and a cursor. In the system, a state where a central icon is selected is first set in a case where the hand of the driver is in any position of the pointing device. In the system in related art, the positions of other icons may continuously be recognized with the central icon being a reference in a case where the hand is placed in any position of the pointing device.

SUMMARY

In one general aspect, the techniques disclosed here feature a system including: a sensor that detects motions of a first portion and a second portion of a body of a user; a controller that sets an association relationship between a coordinate system of a real space and a coordinate system of a virtual space in response to the motion of the first portion and receives an operation for an object in the virtual space in response to a position and the motion of the second portion; and a notification device that contactlessly notifies a third portion of the body of prescribed information.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram that illustrates one example of a coordinate association table of the first embodiment;

DETAILED DESCRIPTION

Figure 1:
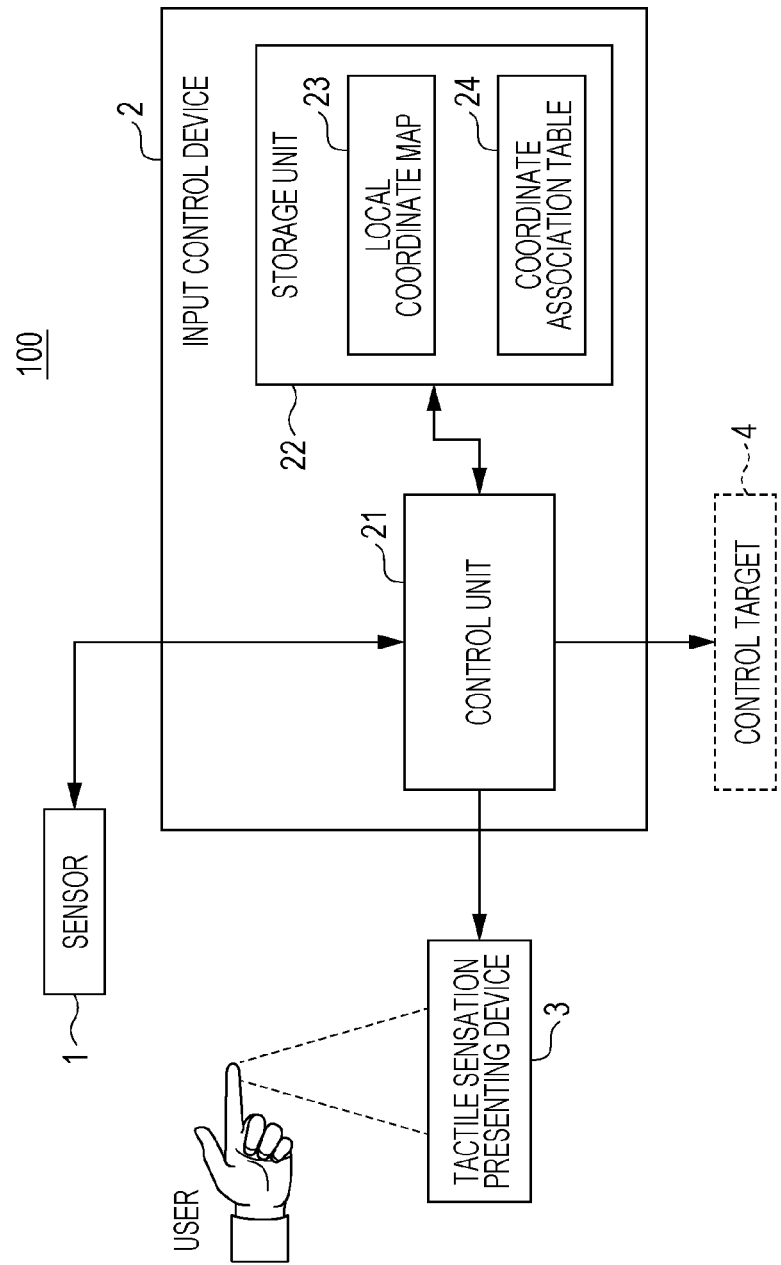
FIG. 1 is a block diagram that illustrates a configuration of a gesture input system according to a first embodiment.

A gesture input system according to an aspect of the present disclosure includes a sensor that detects motions of a first portion and a second portion of a body of a user, a controller that sets an association relationship between a coordinate system of a real space and a coordinate system of a virtual space in response to the motion of the first portion and receives an operation for an object in the virtual space in response to a position and the motion of the second portion, and a notification device that notifies a third portion of the body of prescribed information in response to an action of the controller in a contactless manner.

The "first portion" is a portion of the body that is detected to read a prescribed gesture which is associated with an operation for setting the association relationship between the coordinate system of the real space and the coordinate system of the virtual space. The "second portion" is a portion of the body that is detected to read a prescribed gesture which is associated with an operation for the object. The "third portion" is a portion of the body to which the prescribed information is notified.

"Detecting a motion" means detection of at least one selected from a group consisting of a movement amount, a movement velocity, a movement direction, and a stationary time of a detection target, for example. "Detecting a motion" includes not only the detection of moving of the detection target but also the detection of not moving of the detection target.

The "prescribed information" may be information for indicating that the association relationship is set, may be information for supporting an operation for the object, and may be information for indicating that the operation for the object is received, for example.

"Reference section", "traced section", and "notified section (or tactile sensation presenting section)" that will be described in the following various embodiments are respective examples of the "first portion", the "second portion", and the "third portion".

The "selectable part" that will be described in the following various embodiments is one example of the "object". The objects are an icon, a button, and a scroll bar, for example. The objects are not limited to those that may be visually recognized by the user but include those that may be recognized by the user through an operation.

An "input control device" that will be described in the following various embodiments is one example of the "controller". The controller may be a semiconductor device, a semiconductor integrated circuit (IC), or large scale integration (LSI), for example, or an electronic circuit as a combination thereof. The LSI or IC may be integrated into one chip or may be formed by combining plural chips. For example, each function block that will be described in the embodiments may be integrated into one chip. Here, the LSI or IC may be referred to as system LSI, very large scale integration (VLSI), or ultra large scale integration (ULSI), for example, in accordance with the degree of integration. The controller includes a memory in which a program for executing a prescribed algorithm is recorded. The algorithm includes a step of setting the association relationship between the coordinate system of the real space and the coordinate system of the virtual space in response to the motion of the first portion of the body of the user and a step of receiving an operation for the object in the virtual space in response to the position and the motion of the second portion of the body, for example.

In the gesture input system according to an aspect, for example, the notification device may stimulate the cutaneous sensation of the third portion to provide a notification of the prescribed information.

The "cutaneous sensation" is the sensation that a human body may recognize through the skin. Examples of the cutaneous sensation may include the sense of touch, the sense of vibration, the sense of pressure, the sense of heat, the sense of cold, and the sense of pain. "Stimulating the cutaneous sensation" may be providing a stimulus by a vibration and/or a pressure or may be providing heat sensation and/or cold sensation, for example. For example, the notification device may provide a vibration and/or an acoustic radiation pressure to the user by a vibrator (an ultrasonic vibrator, for example), may generate plasma in the air by laser and thereby provide an impact on the skin that contacts with the plasma, or may provide an air pressure wave to the user by an air cannon. Alternatively, the notification device may provide the heat sensation to the user by an infrared source or may provide the cold sensation to the user by a Peltier element. In other words, the notification device may include at least one selected from a group consisting of the vibrator, the air cannon, the Peltier element, and the infrared source. Note that in the following embodiments, the stimulus for the cutaneous sensation may be referred to as "tactile sensation" for convenience of description. However, the "cutaneous sensation" in the present disclosure is not limited to the sense of touch.

In the present disclosure, coordinates that are mapped in the real space may be referred to as "real coordinates", and coordinates that are mapped in the virtual space corresponding to the real space may be referred to as "virtual coordinates".

In the gesture input system according to an aspect, for example, the controller may set a base point in the real space in response to the motion of the first portion and may set the association relationship based on the base point.

"Setting the association relationship based on the base point" may include a step of matching the base point set in the real space (specific real coordinates, for example) and the base point that is in advance set in the virtual space (specific virtual coordinates, for example), for example.

A "home position" that will be described in the following various embodiments is one example of the "base point".

All the various embodiments that will be described in the following merely illustrate specific examples. Values, shapes, elements, arrangement or connection of elements, steps, orders of steps, and so forth that are described in the following embodiments are mere examples and do not limit the present disclosure. The elements that are not described in the independent claims among the elements that will be described in the following are optional elements. Further, the configurations to which the same reference characters are given in the drawings may not be described.

Underlying Knowledge Forming Basis of the Present Disclosure

In a system in related art that is disclosed in Japanese Unexamined Patent Application Publication No. 2004-345549, because the location to which an input is possible is limited to the position of a pointing device, the user has to touch the pointing device to perform an input. In addition, in the system in related art, the user has to watch a display unit in order to correctly perform an intended input. As described above, the system in related art is inconvenient for the user.

The gesture input system and a gesture input method according to various embodiments that will be described in the following enable the user to perform a correct input without touching an input unit by the hand or watching the display unit. The gesture input system that will be described in the following employs a gesture input and a contactless notification. Accordingly, the user may perform an input accurately and quickly without touching the input unit by the hand. For example, in a case where the user drives an automobile, the user may perform an input operation without lowering the concentration on driving.

The "gesture input" is an input method in which the user informs an electronic apparatus or the like of an intention of an operation of the user by using a motion of a portion of the body. In general, in an electronic apparatus, the motion of the body in the gesture input, the intention of the user about the operation of the electronic apparatus, and a command in the electronic apparatus are related with each other. The electronic apparatus analyzes the motion of the body that is detected by a sensor, makes a determination about an expression of the intention of the user about the operation, and executes a command that is related with a determination result.

The gesture input is performed by using a portion of the body (a fingertip, for example). The sensor traces the motion of the portion of the body. In the following description, the portion of the body that is traced for the gesture input may be referred to as "traced section". In the gesture input, the motion of the body is read as a state change of the traced section from a certain time as a starting point, for example. The state change of the traced section is established with a combination of the movement amount, the movement velocity, the movement direction, the stationary time, and so forth of the traced section.

In the following description, the base point (start point) of the gesture input in the space may be referred to as "home position". The home position in the real space is the real coordinates where the traced section is positioned at the time as the starting point of the gesture input, for example.

In other words, the motion of the body in the gesture input is established with the relative relationship between the traced section and the home position. For example, the motion of the body in the gesture input is established with a combination of the movement amount, the movement velocity, the movement direction, the stationary time, and so forth of the traced section from the home position.

In the gesture input system and the gesture input method according to various embodiments that will be described in the following, a region for receiving a prescribed input (that is, the selectable part) is set in the virtual space. The virtual coordinates of the selectable part is associated with the real coordinates at which the portion of the body of the user is present. Which position of the selectable parts the traced section of the user is in is calculated. Accordingly, the user may select at least one selectable part set in the virtual space by the gesture input. Accordingly, the user may perform an input accurately and quickly. In the following description, coordinates in the virtual space may be referred to as "local coordinates", and coordinates in the real space may be referred to as "global coordinates".

First Embodiment

A first embodiment will hereinafter be described with reference to drawings. Note that in the description made hereinafter, terms will be defined as follows.

Reference section: the portion of the body which is referred to in a case where the expression of the intention of the user that the user requests setting of the home position is read.

Traced section: the portion of the body that is traced for the gesture input.

Tactile sensation presenting section: the portion of the body to which the tactile sensation is presented in a contactless manner.

[1. Configuration of Gesture Input System]

FIG. 1 illustrates a configuration example of a gesture input system according to the first embodiment. A gesture input system 100 of this embodiment includes a sensor 1 that detects the motion of the body of the user, an input control device 2 that receives the gesture input of the user based on an output of the sensor 1, and a tactile sensation presenting device 3 that presents the tactile sensation to the user in accordance with the control by the input control device 2.

The sensor 1 is a sensor that is capable of detecting the motion of a human body. The sensor 1 includes a visual sensor such as a camera. For example, the sensor 1 is a distance image sensor or a laser sensor that is capable of three-dimensionally detecting the motion of the human body in a contactless manner. The sensor 1 may be a sensor that is capable of detecting the motion of the human body and may be an ultrasonic sensor, an infrared sensor, or a visible light sensor, for example.

In this embodiment, the sensor 1 detects a motion of the reference section that is a portion of the body of the user, a motion of the traced section that is a portion of the body of the user, and a motion of the tactile sensation presenting section (or the notified section) that is a portion of the body of the user. For example, the sensor 1 acquires three-dimensional coordinates of the reference section, the traced section, and the tactile sensation presenting section as information about the motions of the reference section, the traced section, and the tactile sensation presenting section. The reference section, the traced section, and the tactile sensation presenting section may arbitrarily be decided by the input control device 2. For example, the reference section, the traced section, and the tactile sensation presenting section are the upper half of the body, face, hand, finger, or fingertip. The reference section, the traced section, and the tactile sensation presenting section may be the same location or may be different locations. The sensor 1 outputs the information about the detected motions of the reference section, the traced section, and the tactile sensation presenting section.

The input control device 2 includes a control unit 21 that sets the home position and receives the gesture input based on the information detected by the sensor 1 and a storage unit 22 that stores the set home position. The control unit 21 may be realized by a semiconductor element or the like, for example, a microcomputer. The control unit 21 may be configured only with hardware or may be realized by combining hardware and software. The control unit 21 controls a control target 4 in accordance with the received gesture input. The control target 4 is an arbitrary device, for example, a navigation device, an air conditioning device, or an audio device.

The storage unit 22 may be realized by a DRAM, a flash memory, a ferroelectric memory, or the like, for example. The storage unit 22 stores a local coordinate map 23 that represents the virtual coordinates of at least one selectable part, which is the region for receiving the prescribed input, and a coordinate association table 24 in which the virtual coordinates of the selectable part in the local coordinate map 23 are associated with the real coordinates.

The tactile sensation presenting device 3 is a notification device that is capable of presenting a tactile sensation via the air. The "tactile sensation" is the sensation that the human body may recognize through the skin and includes sensations due to effects of force such as a vibration and a pressure and thermal sensations such as warmth and coldness. Presenting a tactile sensation via the air is causing the human body to sense a tactile sensation without contact with the human body. In this embodiment, the acoustic radiation pressure of an ultrasonic wave is used as presentation of a tactile sensation via the air.

The tactile sensation presenting device 3 of this embodiment includes an ultrasonic vibrator array that is configured by arraying plural ultrasonic vibrators. The ultrasonic vibrator array may present the sense of touch on a surface of the human body by creating a focus of an ultrasonic wave in an arbitrary position in the air. A static pressure that is referred to as acoustic radiation pressure occurs at the focus of the ultrasonic wave in addition to a vibration of an acoustic pressure. The acoustic radiation pressure occurs in a case where the ultrasonic wave that propagates in the air is blocked by a physical object that has different acoustic impedance from the air. As for ultrasonic wave with a high acoustic pressure level, the ultrasonic wave is blocked by the surface of the body, and this causes a force that pushes the surface of the body and is recognizable by a person. That is, a force may be presented to the body in a contactless manner. In general, a person is capable of sensing the frequencies of 20 Hz or higher to 20 kHz or lower as sound, and this frequency band is referred to as audible range. An "ultrasonic wave" is an acoustic wave that has a frequency of 20 kHz or higher and is not audible to the ear of a person. In order to present the tactile sensation independently from the sense of hearing, the frequency may be set to 20 kHz or higher. There is not a restriction of the upper limit of the frequency of the ultrasonic wave. However, because the attenuation of an ultrasonic wave that propagates in the air increases as the frequency becomes higher, the frequency of the ultrasonic wave that is used for presenting the tactile sensation is desirably set to 20 to 200 kHz and more desirably 20 to 100 kHz. The acoustic pressure level of the ultrasonic wave that may present a pressure which is recognizable by a person to the surface of the body is set to 140 dB or higher, desirably 150 dB or higher, more desirably 160 dB or higher.

The acoustic radiation pressure may be changed through time by intermittently driving the ultrasonic vibrator and/or performing amplitude modulation of an ultrasonic vibration. Accordingly, a vibration may be presented to the user. Cutaneous receptors that function for the sense of vibration exhibit high sensitivities at specific frequencies of vibration. Thus, the modulation frequency of the acoustic radiation pressure may be adjusted to those frequencies of vibration. Accordingly, it is possible that the same acoustic radiation pressure provides a stronger tactile sensation. The modulation frequency is desirably set to 0 to 300 Hz and more desirably 100 to 300 Hz.

[2. Setting of Home Position]

Figure 2:
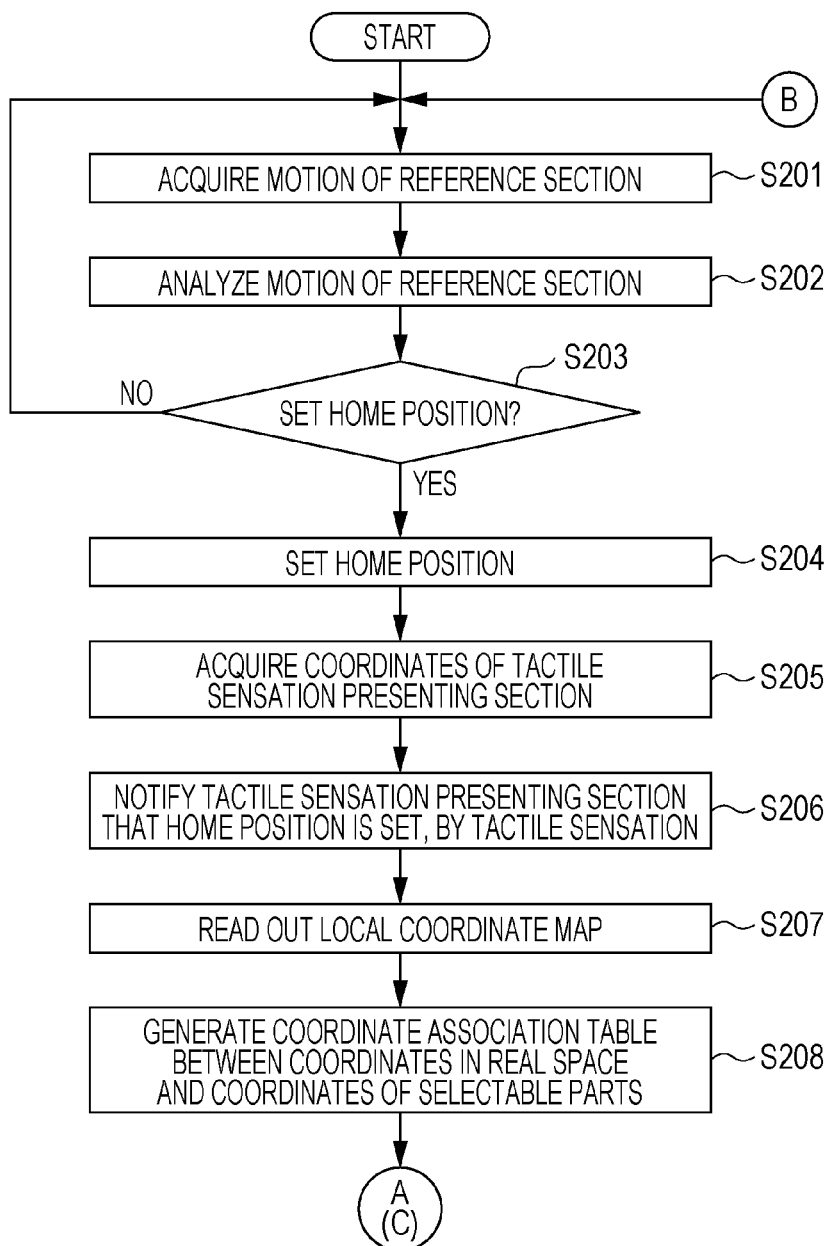
FIG. 2 is a flowchart that illustrates a gesture input method of the first embodiment.

FIG. 2 illustrates a gesture input method according to the first embodiment. After the gesture input system 100 is started, the sensor 1 starts acquiring the motion of the reference section, which is a portion of the body of the user, in accordance with an instruction of the control unit 21 (S201). There may be one or plural reference sections. Specifically, as one example, the sensor 1 acquires the real coordinates of the reference section as the information about the motion of the reference section. The real coordinates of the reference section will be referred to as "reference coordinates". The sensor 1 outputs the acquired information about the motion of the reference section to the input control device 2.

In the input control device 2, the control unit 21 analyzes the motion of the reference section based on the information from the sensor 1 (S202). For example, the control unit 21 analyzes the movement amount of the reference section, the movement velocity of the reference section, the movement direction of the reference section, and the stationary time of the reference section based on the reference coordinates and thereby analyzes the motion of the reference section. The control unit 21 determines whether or not a prescribed motion is detected based on the results of the analysis (S203). The prescribed motion is a motion by which the user demonstrates an intention of setting the home position and is in advance decided by an arbitrary combination of the movement amount, the movement velocity, the movement direction, the stationary time, and so forth of the reference section. Information of the prescribed motion is stored in the storage unit 22. For example, a motion in which the index finger of the right hand (that is, the reference section) passes or crosses a plane assumed in the real space may be decided in advance as the prescribed motion. Accordingly, the user is enabled to set the home position only by the index finger of the right hand.

In a case where the control unit 21 does not detect the prescribed motion (that is, a case where a determination is made that the user does not express the intention of setting the home position) (No in S203), the process returns to step S201, and the acquisition of the motion of the reference section by the sensor 1 is continued.

In a case where the control unit 21 detects the prescribed motion (that is, a case where a determination is made that the user expresses the intention of setting the home position) (Yes in S203), the home position that is the base point in the real space is set (S204). Specifically, the real coordinates of the traced section at the time point at which the prescribed motion is detected is acquired from the sensor 1, and those real coordinates are set as the home position. The control unit 21 stores information of the coordinates of the set home position in the storage unit 22. The real coordinates of the traced section will be referred to as "traced coordinates". The traced section may be decided in advance before the home position is set or may be decided simultaneously with the setting of the home position. The home position is referred to as the base point in the gesture input.

The control unit 21 acquires the real coordinates of the tactile sensation presenting section from the sensor 1 (S205). The tactile sensation presenting section may be decided in advance before the home position is set or may be decided simultaneously with the setting of the home position. There may be one or plural tactile sensation presenting sections. The real coordinates of the tactile sensation presenting section will be referred to as "tactile sensation presenting coordinates". The control unit 21 stores the acquired tactile sensation presenting coordinates in the storage unit 22.

After the home position is set, the tactile sensation presenting device 3 presents the tactile sensation to the tactile sensation presenting section of the user, which is indicated by the tactile sensation presenting coordinates in accordance with an instruction of the control unit 21, in a contactless manner and thereby notifies the user that the home position is set (S206). Accordingly, the user may recognize that the home position is set independently from the sense of sight, the sense of hearing, or the sense of touch through a solid body and may recognize the position of the traced section at the time when the tactile sensation is presented as the position of the home position.

The tactile sensation presenting section and the traced section may be the same. In this case, the user may recognize that the home position is set in the position of the home position by the tactile sensation. Thus, a more intuitive gesture input is enabled.

[3. Combination of Reference Section, Tactile Sensation Presenting Section, and Traced Section]

The reference section, the tactile sensation presenting section, and the traced section may be set to arbitrary portions of the body. For example, all of the reference section, the tactile sensation presenting section, and the traced section may be set to the fingertip of the index finger of the right hand in advance. For example, the gesture input system 100 may determine that the user expresses the intention of setting the home position in a case where the fingertip of the index finger of the right hand of the user crosses the plane assumed in the real space. In this case, the gesture input system 100 may set the real coordinates of the fingertip of the index finger of the right hand at the time when the crossing of the fingertip of the index finger of the right hand of the user across the plane assumed in the real space is detected as the home position and may present the tactile sensation to the fingertip of the index finger of the right hand in a contactless manner about the fact that the home position is set.

As another example, the eyelids of both eyes may be set as the reference sections, the fingertip of the index finger of the right hand may be set as the traced section, and the forehead may be set as the tactile sensation presenting section in advance. For example, the gesture input system 100 may determine that the user expresses the intention of setting the home position in a case where the user blinks both of the eyes two times successively. In this case, the gesture input system 100 may set the real coordinates of the fingertip of the index finger of the right hand at the time when the two successive blinks of both of the eyes are detected as the home position and may present the tactile sensation to the forehead in a contactless manner about the fact that the home position is set.

As still another example, the fingertips of the five fingers of the right hand may be set as the reference sections in advance. For example, the gesture input system 100 may determine that the user expresses the intention of setting the home position in a case where the fingertip of any one of the five fingers of the right hand of the user crosses the plane assumed in the real space. In this case, the gesture input system 100 may set the real coordinates of the fingertip of any one of the five fingers of the right hand at the time when the crossing of the fingertip of the one finger across the plane assumed in the real space is detected as the home position and may present the tactile sensation to the fingertip of the one finger in a contactless manner about the fact that the home position is set.

[4. Local Coordinate Map and Coordinate Association Table]

After the home position in the real space is set (S204), the control unit 21 of the input control device 2 reads out the local coordinate map 23 from the storage unit 22 (S207), associates the virtual coordinates of the selectable part, which are indicated by the local coordinate map 23, with the real coordinates, and thereby generates the coordinate association table 24 (S208). In this embodiment, the local coordinate map 23 is in advance stored in the storage unit 22. The control unit 21 stores the generated coordinate association table 24 in the storage unit 22.

Figure 3:
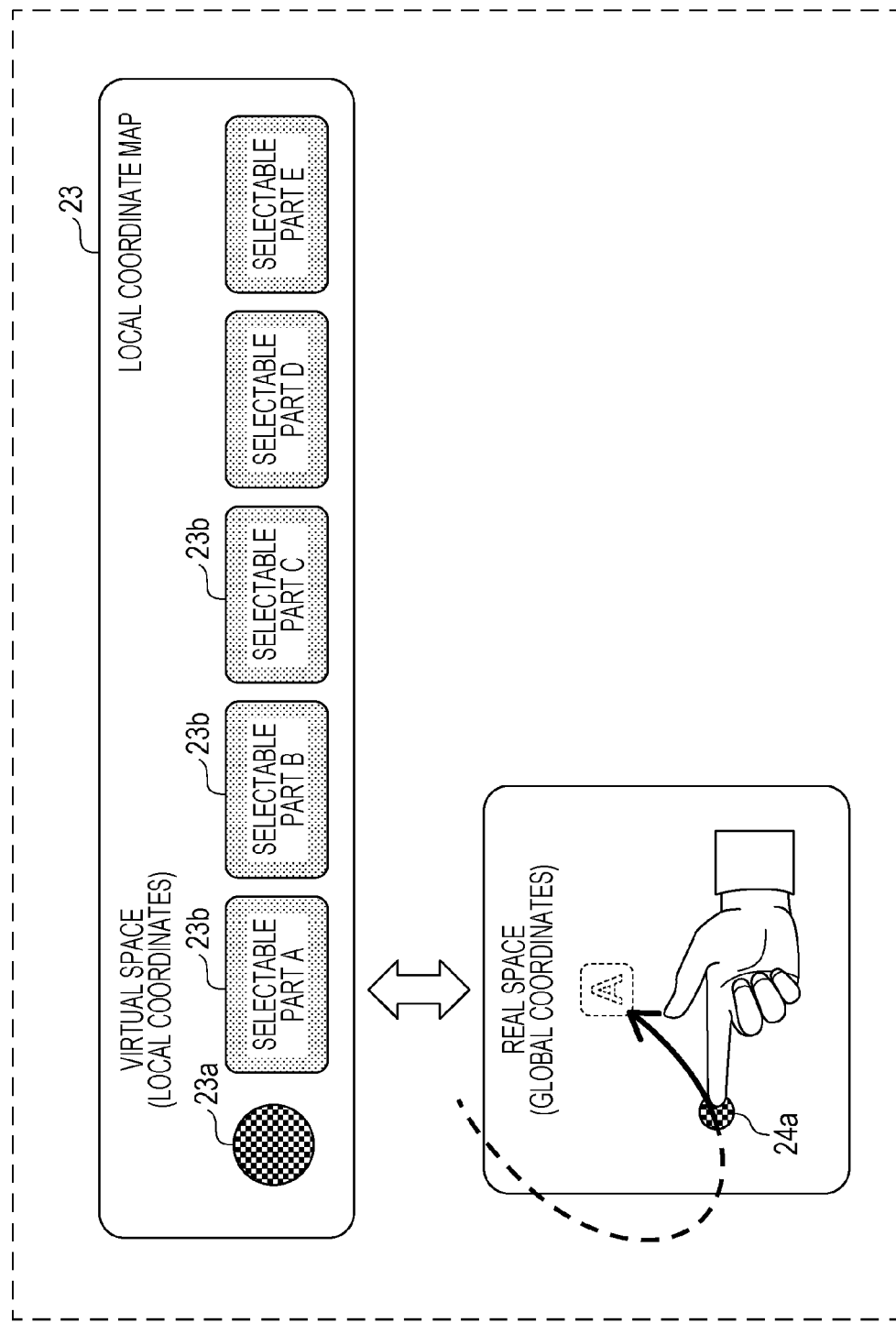
FIG. 3 is a diagram that illustrates examples of a selectable part local coordinate map and a real space in the first embodiment.

The upper part of FIG. 3 illustrates one example of the local coordinate map 23. The local coordinate map 23 includes the coordinates of a home position 23a as the base point in the virtual space and the coordinates of at least one selectable part 23b. The local coordinate map 23 represents the coordinates of the selectable parts 23b in the virtual space while the coordinates of the home position 23a are set as the origin. A different function is allocated to each of the selectable parts 23b. For example, a function of changing a parameter related to the control target 4 is allocated to the selectable parts 23b. In this case, the user selects the selectable part 23b and performs an input operation that is in advance decided. Accordingly, the user may change the parameter related to the control target 4. The local coordinate map 23 may not in advance be stored in the storage unit 22 and may be generated based on the positional relationship between the home position in the real space and a detectable range of the sensor 1 at each time when the home position in the real space is set, for example.

The lower part of FIG. 3 illustrates one example of the real space. Because the home position 23a and the selectable part 23b are present in the virtual space, the user may not directly observe or touch those in the real space. The user indirectly recognize the arrangement relationship among the selectable parts 23b that are defined by the local coordinate map 23 and thereby performs the gesture input. For example, a display device (not illustrated) visually displays the local coordinate map 23 as an image when the user makes an instruction or for a prescribed time from a starting time of the gesture input system 100. Accordingly, the user may recognize the arrangement relationship between the home position 23a and the selectable parts 23b, which are defined in the virtual space.

FIG. 4 illustrates one example of a coordinate association table 24. The coordinate association table 24 associates the global coordinates of a home position 24a in the real space with the local coordinates of the home position 23a in the virtual space. In addition, the coordinate association table 24 associates the local coordinates of the selectable part 23b in the virtual space with the global coordinates in the real space. Information of the local coordinates of the home position 24a and the selectable parts 23b in the virtual space are included in the local coordinate map 23. The control unit 21 generates the coordinate association table 24 as illustrated in FIG. 4 based on the relative positional relationship between the local coordinates of the home position 23a and the local coordinates of the selectable parts 23b and the home position 24a in the real space. For example, the local coordinates of the home position 23a and the global coordinates of the home position 24a may be set as a reference point, and the global coordinates that correspond to the local coordinates of the selectable part 23b may arbitrarily be set based on the reference point. For example, a plane that is vertical to the axis which connects the home position 24a with the face of the user in the real space is assumed, and the local coordinates of the selectable part 23b may be associated with global coordinates on the plane. In the coordinate association table 24, the association between the global coordinates and the local coordinates may not precisely reflect distances and directions in the real space. For example, the coordinate association table 24 may reflect only one direction of three axial directions of the global coordinates. Further, for example, the coordinate association table 24 may reflect the movement velocity of the traced coordinates or may reflect the movement time and the movement direction of the traced coordinates. As described above, the input control device 2 associates the global coordinates of the home position 24a in the real space with the local coordinates of the home position 23a in the virtual space. In addition, the tactile sensation presenting device 3 may notify the user that the home position 24a is set. Accordingly, the user may recognize the position of the home position 24a in the real space as the position of the home position 23a in the virtual space. Thus, the user is enabled to select the selectable part 23b in the virtual space by the motion of the body in the real space.

The storage unit 22 stores information (a function, for example) that decides the association relationship between the local coordinates of the selectable part 23b and the global coordinates in the real space. Then, after the control unit 21 sets the position of the home position 24a in the real space, the control unit 21 generates the coordinate association table 24 by using the information (a function, for example) stored in the storage unit 22.

As one example, the function that represents the association relationship between the X coordinate of the local coordinates and the X coordinate of the global coordinates will be described in the following. For example, a case is assumed where in the virtual space, the local coordinate of the home position 23a is 0 and the local coordinates of selectable parts A to E are x2 to x6, respectively. In this case, in a case where the global coordinate of the home position 24a in the real space is X1, the global coordinates that correspond to the selectable parts A to E are decided as the following X2 to X6, for example.

Global coordinate X2 in real space of selectable part $A=X1+x2\times\alpha$

Global coordinate X3 in real space of selectable part $B=X1+x3\times\alpha$

Global coordinate X4 in real space of selectable part $C=X1+x4\times\alpha$

Global coordinate X5 in real space of selectable part $D=X1+x5\times\alpha$

Global coordinate X6 in real space of selectable part $E=X1+x6\times\alpha$

Here, $\alpha$ is a prescribed coefficient and indicates the ratio of the scale of the real space to the scale of the virtual space.

[5. Gesture Input]

Figure 5:
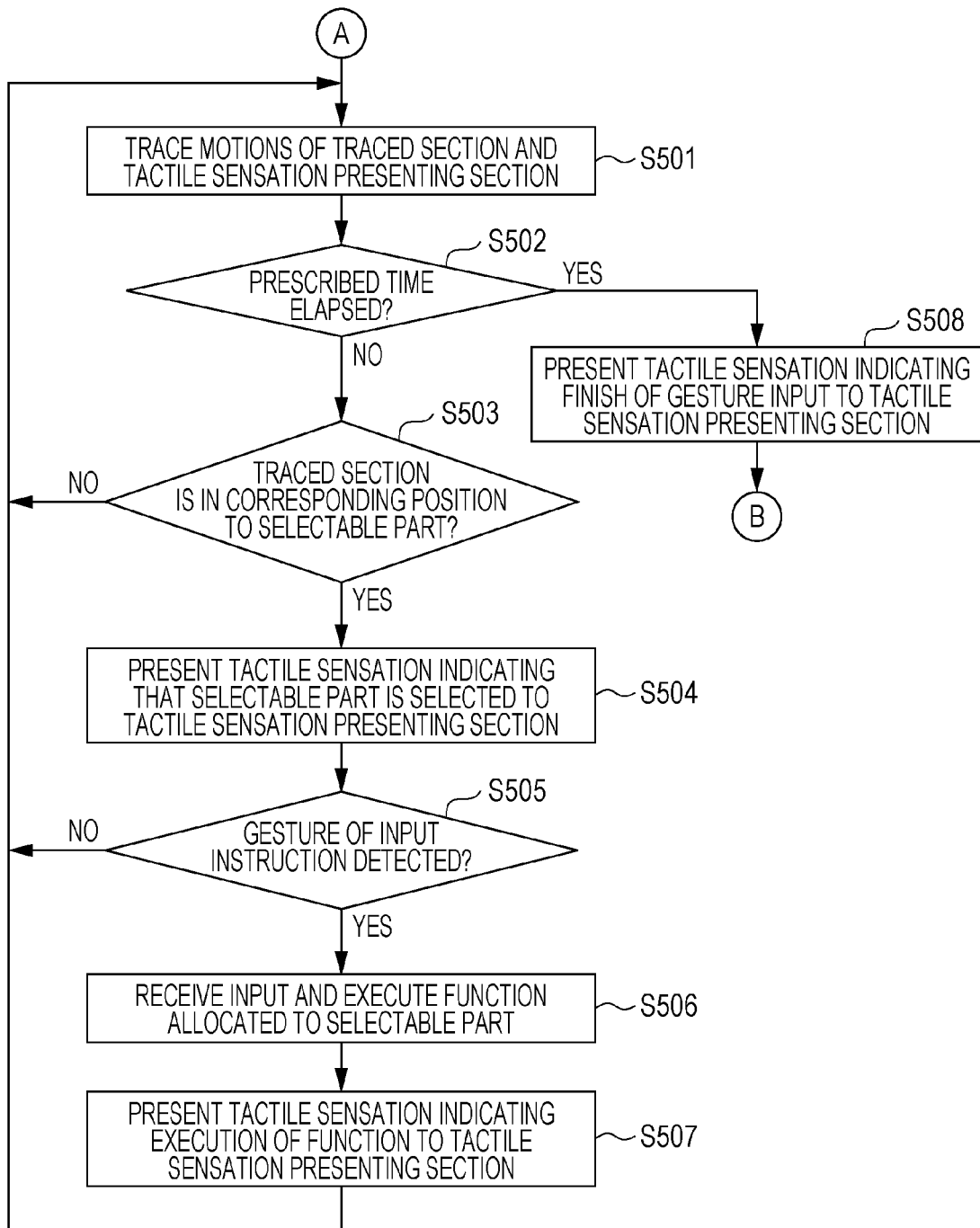
FIG. 5 is a flowchart that illustrates the gesture input method of the first embodiment.

FIG. 5 illustrates a flow that follows FIG. 2. After the control unit 21 of the input control device 2 generates the coordinate association table 24, the sensor 1 traces the motion of the traced section and the motion of the tactile sensation presenting section in accordance with an instruction of the control unit 21 (S501). Specifically, the sensor 1 acquires the real coordinates of the traced section as the information about the motion of the traced section and acquires the real coordinates of the tactile sensation presenting section as the information about the motion of the tactile sensation presenting section. There may be one or plural traced sections and one or plural tactile sensation presenting sections. The sensor 1 outputs the acquired information about the motions of the traced section and the tactile sensation presenting section to the input control device 2.

In the input control device 2, the control unit 21 determines whether or not a prescribed time elapses after the sensor 1 starts tracing the motion of the traced section (S502). In a case where the prescribed time elapses (Yes in S502), the tactile sensation presenting device 3 presents the tactile sensation to the tactile sensation presenting section that is indicated by the tactile sensation presenting coordinates and thereby indicates a finish of the gesture input to the user (S508). The setting of the home position 24*a* is recalled, and the process returns to the acquisition of the motion of the reference section (S201). Accordingly, in a case where a state where the traced section is separated from the positions of any of the selectable parts continues for a prescribed time or longer, a waiting state for the gesture input may be canceled. Alternatively, in a case where a state where the traced section is separated from the position of the home position 24*a* continues for a prescribed time or longer, the waiting state for the gesture input may be canceled.

In a case where the prescribed time does not elapse (No in S502), the control unit 21 refers to the coordinate association table 24 based on the information from the sensor 1 and determines whether or not the traced section is in the position that corresponds to the selectable part (S503).

For example, in the example illustrated in FIG. 3, a determination step is executed as follows. First, in the local coordinate map 23, the position of a "selectable part A" 23*b* in the virtual space is defined. For example, the position of the "selectable part A" 23*b* is on the right side of the home position 23*a* (that is, the base point) and in a position that is separated from the home position 23*a* by 30 mm. Further, a prescribed position in the real space that corresponds to the position of the "selectable part A" 23*b* in the virtual space is associated by the coordinate association table 24. For example, the prescribed position in the real space is on the right side of the home position 24*a* (that is, the base point) and in a position that is separated from the home position 24*a* by 30 mm. In such a case, when the user moves the fingertip of the index finger of the right hand (that is, the traced section) to the prescribed position in the real space, the control unit 21 determines that the traced section is in the position that corresponds to the "selectable part A" 23*b* in the virtual space.

In a case where the traced section is not in the position that corresponds to the selectable part (No in S503), the sensor 1 continues to trace the traced section until the prescribed time elapses (S501).

In a case where the traced section is in the position that corresponds to the selectable part (Yes in S503), the tactile sensation presenting device 3 presents the tactile sensation to the tactile sensation presenting section in accordance with the instruction of the control unit 21 and thereby notifies the user that the selectable part is selected (S504). In this case, the tactile sensation may be changed with respect to each of the selectable parts. The control unit 21 of the input control device 2 analyzes the motion of the traced section and determines whether or not a prescribed gesture is detected (S505). The prescribed gesture is associated with an instruction for executing a function that is allocated to the selectable part. This association relationship is in advance decided and is stored in the storage unit 22.

The control unit 21 analyzes the relative relationship between the home position 24*a* in the real space and the traced coordinates based on the information from the sensor 1. Specifically, the control unit 21 may analyze the motion of the traced section by detecting a state change of the traced section with respect to the home position 24*a* as the base point. The state change of the traced section is a combination of the movement amount, the movement velocity, the movement direction, and the stationary time of the traced section, for example.

In a case where the traced section is in the position that corresponds to the selectable part and where the prescribed gesture is not detected (No in S505), the acquisition of the motion of the traced section by the sensor 1 is continued (S501).

In a case where the traced section is in the position that corresponds to the selectable part and where the prescribed gesture is detected (Yes in S505), the control unit 21 receives the gesture input and controls the control target 4 such that the function allocated to the selectable part is executed (S506).

In addition, the tactile sensation presenting device 3 notifies the tactile sensation presenting section of the tactile sensation in a contactless manner in accordance with the instruction of the control unit 21 and thereby indicates the user that the gesture input is received and the function allocated to the selectable part is executed (S507).

The tactile sensation that is presented to the user when the traced section comes to the position which corresponds to the selectable part (S504) may be different from the tactile sensation that is presented to the user when the gesture input is received and/or the function allocated to the selectable part is executed (S507). For example, those tactile sensations may be distinguished by the intensities of pressure or different vibrations. The tactile sensation that is presented to the user when the traced section is in the position which corresponds to the selectable part (S504) and the tactile sensation that is presented to the user when the gesture input is received and/or the function allocated to the selectable part is executed (S507) may be the same as or different from the tactile sensation at the time when the home position is set (S206). The tactile sensation presenting section in a case where the traced section is in the position that corresponds to the selectable part and the tactile sensation presenting section in a case where the gesture input is received and/or the function allocated to the selectable part is executed may be the same as or different from the tactile sensation presenting section in a case where the setting of home position is notified.

[6. Effects and Supplemental Matters]

The gesture input system 100 of this embodiment associates the coordinates in the virtual space of the selectable part, which is the region for receiving a prescribed input, with the real coordinates where the user is present. Accordingly, the user may select the selectable part in the virtual space by the gesture input in the real space. Thus, the user may perform an input in an arbitrary position in a detection range of the sensor 1. The user may quickly perform an input without touching the input unit such as a touch panel by the hand. In addition, the gesture input system 100 of this embodiment notifies the user that the home position is set and the selectable part is selected in a contactless manner. Thus, the user may recognize the position of the home position and may recognize that the selectable part is selected without watching the display unit. As described above, the user may correctly select the selectable part without watching the display unit. As a result, the user may perform an input accurately and quickly, and convenience of the input operation is improved. For example, the user may set the home position and recognize the position thereof independently from the sense of sight or the sense of hearing. Thus, the user may intuitively carry out the gesture input with the home position being the base point.

The gesture input system 100 of this embodiment may present the home position by the tactile sensation in a contactless manner. Thus, the user may recognize the home position independently from the sense of sight, the sense of hearing, or the sense of touch through a solid body. Accordingly, for example, the user may perform a desired input operation quickly and accurately by depending on the sense of touch even in a situation in which the user may not watch the display unit. Further, for example, the user may perform a desired input operation quickly and accurately by depending on the tactile sensation even in a situation in which the user may not listen to a sound presentation. The gesture input system 100 of this embodiment may execute a desired function without being restricted to physical objects such as buttons that are mechanically configured.

Further, instead of the coordinate association table 24, a function may be used which associates the local coordinates of the selectable part 23b in the local coordinate map 23 with the global coordinates in the real space. The function may be stored in the storage unit 22 in advance or may be generated when the home position 24a is set. Further, the function may be a function in which the association relationship between the global coordinates and the local coordinates changes in response to the movement velocity of the traced section. The function may be a function based on the movement distance from the home position 24a to the traced section and the movement velocity, for example.

For example, the global coordinates Xi (i=2 to 6) of the selectable parts 23b (A to E) may be expressed by the following function.

$$Xi = X1 + d \times (i-1)/v \times \alpha$$

However, X1 represents the X coordinate of the set home position 24a in the real space, d represents the distance between the home position 23a in the virtual space and the adjacent selectable part 23b (for example, the selectable part A) or the distance between the selectable parts that are adjacent to each other, v represents the movement velocity of the traced section, and α represents a coefficient that is arbitrarily set.

In this embodiment, a description is made about an example where the sensor 1 detects the motion of the portion of the body of the user and thereby acquires each of the reference coordinates, the traced coordinates, and the tactile sensation presenting coordinates. However, the control unit 21 may analyze the information that is acquired from the sensor 1 and thereby calculates the reference coordinates, the traced coordinates, and the tactile sensation presenting coordinates. For example, the sensor 1 outputs a distance image of a region that includes all of the reference section, the traced section, and the tactile sensation presenting section. In this case, the input control device 2 (the control unit 21, for example) may analyze the distance image and thereby acquire the reference coordinates, the traced coordinates, and the tactile sensation presenting coordinates.

The gesture input system 100 may be configured such that the user may freely set the motion of the reference section to serve as a determination reference for the setting of the home position (S203) and the motion of the traced section to serve as a determination reference for the gesture input (S505). Further, the gesture input system 100 may be configured such that the user may in advance set the reference section, the traced section, and the tactile sensation presenting section.

In this embodiment, the acoustic radiation pressure of an ultrasonic wave is used in the tactile sensation presenting device 3. However, the tactile sensation presenting device 3 is not limited to this but may use a flow of air or infrared rays, for example. For example, the tactile sensation presenting device 3 is capable of presenting a heat sensation to the body in a contactless manner by using infrared rays. Further, it is sufficient that the notification to the user is a contactless notification to the user, and notifications other than the tactile sensation may be used. For example, sound or light may be used.

Second Embodiment

Figure 6:
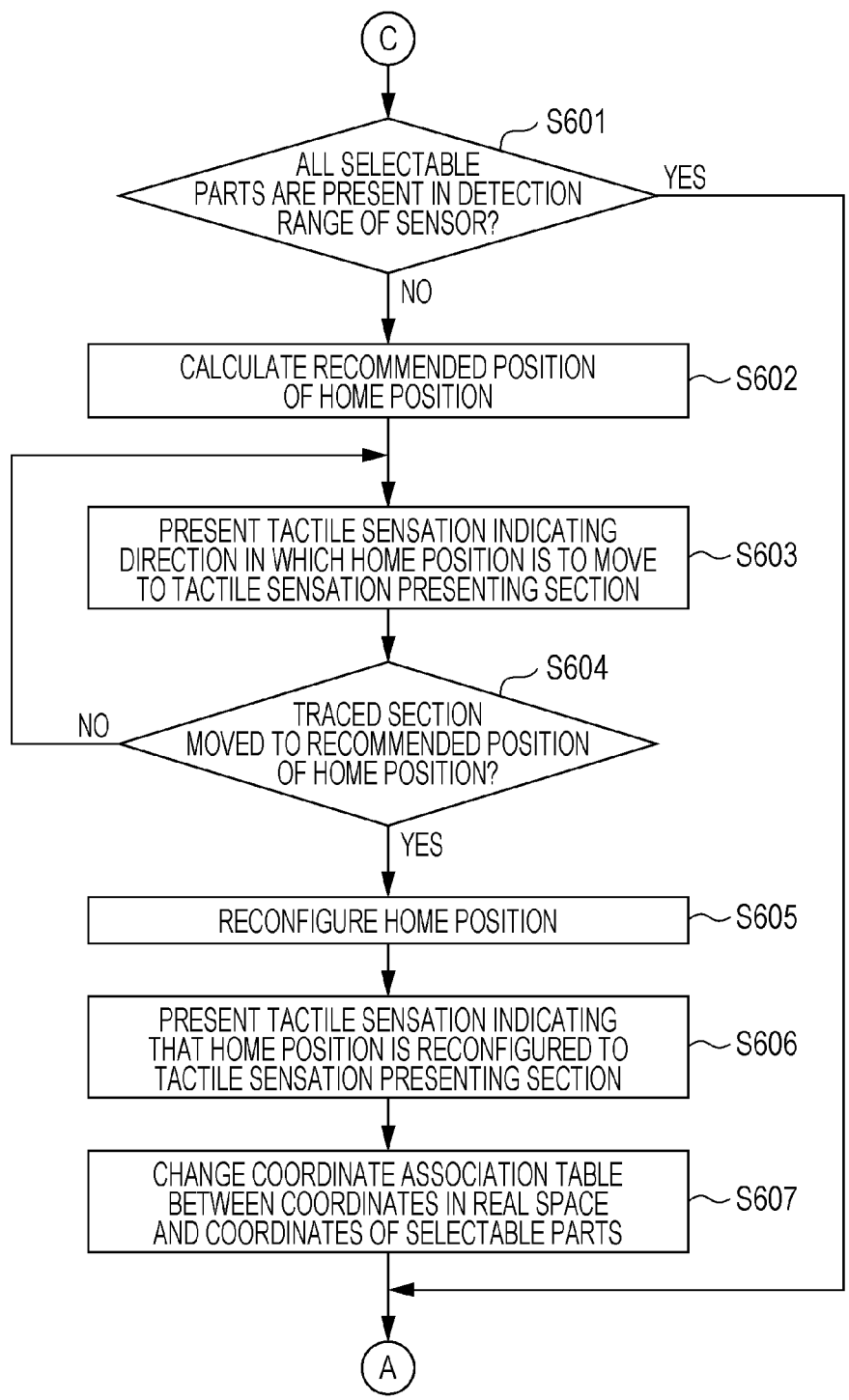
FIG. 6 is a flowchart that illustrates a gesture input method of a second embodiment.

The gesture input system 100 in this embodiment advises the user to move the home position 24a in a case where the home position 24a is set in a position in which the user may not select at least one of the selectable parts. Accordingly, in the gesture input system 100, the user may reconfigure the home position 24a in a position in which the user may select all the selectable parts. FIG. 6 illustrates a gesture input method of a second embodiment. Each step of FIG. 6 is performed between the flow of FIG. 2 and the flow of FIG. 5, that is, after the coordinate association table 24 is generated (S208) and before the motion of the traced section is traced (S501).

Figure 7:
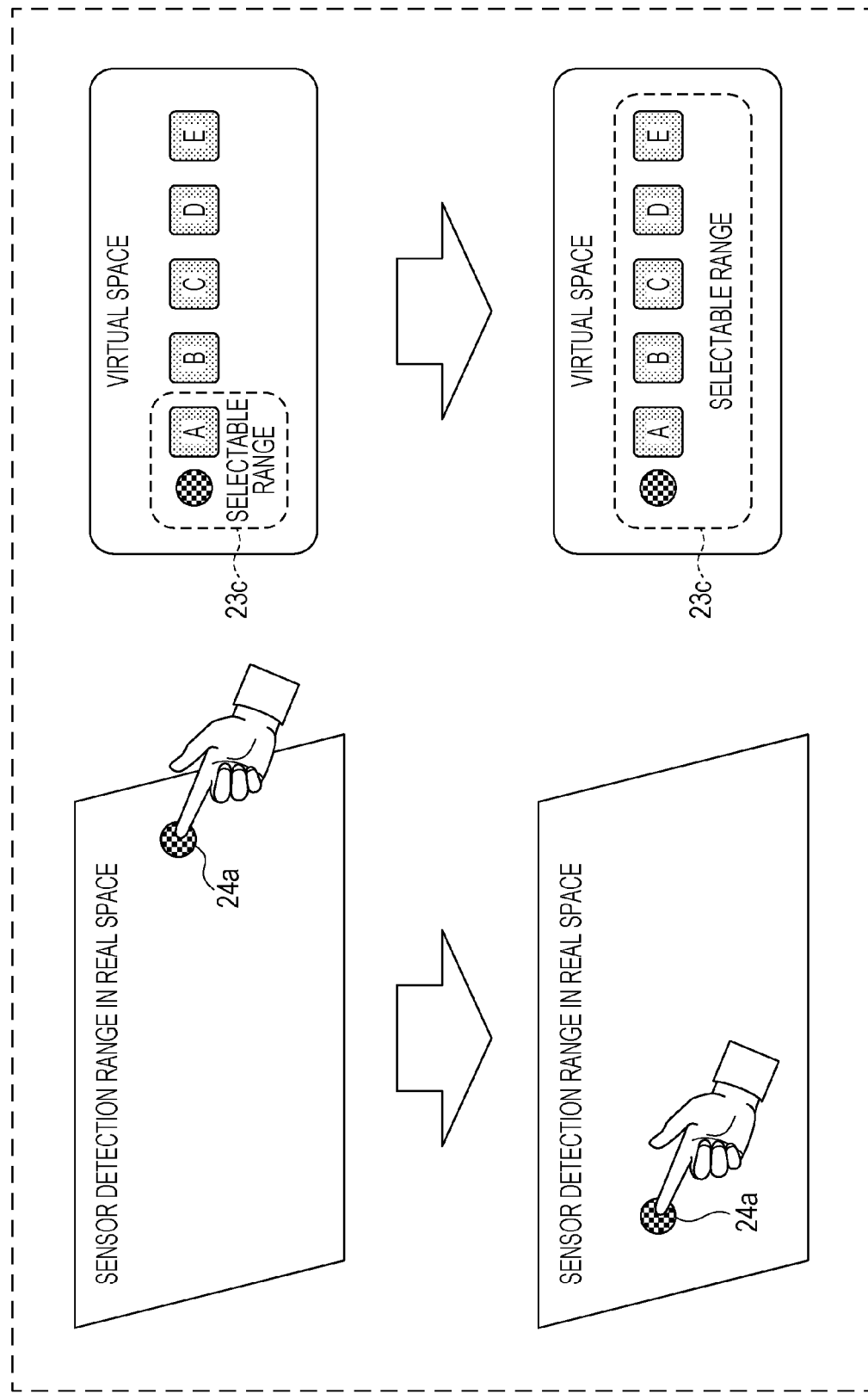
FIG. 7 is a diagram that illustrates a selectable range of selectable parts at a time before a home position moves and the selectable range of the selectable parts at a time after the home position moves in the second embodiment.

The control unit 21 of the input control device 2 refers to the coordinate association table 24 and determines whether or not all the selectable parts are present in the detection range of the sensor 1 (S601). The detection range of the sensor 1 may be stored in the storage unit 22 in advance or may be acquired from the sensor 1. In a case where the control unit 21 determines that at least one of the selectable parts is present outside of the detection range (No in S601), the control unit 21 calculates a recommended position of the home position in which all the selectable parts are in the detection range of the sensor 1 (S602). For example, the control unit 21 calculates the recommended position in which all the selectable parts are in the detection range of the sensor 1 and which is closest to the present home position 24a based on the present home position 24a, the local coordinate map 23, the information (a function, for example) for deciding the global coordinates that correspond to the local coordinates of the selectable parts 23b. The control unit 21 calculates the distance and direction from the position of the present home position 24a to the recommended position. The left upper part and the right upper part of FIG. 7 respectively illustrate the detection range of the sensor 1 and a selectable range 23c at a time before the home position 24a is changed. The left lower part and the right lower part of FIG. 7 respectively illustrate the detection range of the sensor 1 and the selectable range 23c at a time after the home position 24a is changed. For example, in a case where the position of the home position 24a that is initially set is close to a right end of the detection range of the sensor 1 as illustrated in the left upper part of FIG. 7, the selectable parts that may be selected in a case where the traced section moves in the detection range of the sensor 1 are limited to the selectable range 23c as illustrated in the right upper part of FIG. 7. That is, the user may not select the selectable parts outside of the selectable range 23c. In this case, as illustrated in the right lower part of FIG. 7, the control unit 21 calculates the recommended position of the home position 24a in which all the selectable parts are in the selectable range 23c. For example, the control unit 21 calculates how far the home position 24*a* is to be moved in the left direction from the position in which the home position 24*a* is initially set.

The tactile sensation presenting device 3 presents the tactile sensation to the tactile sensation presenting section in accordance with an instruction of the control unit 21 and thereby indicates the direction in which the traced section is to be moved (S603). For example, the tactile sensation presenting device 3 moves the tactile sensation presented to the tactile sensation presenting section in the direction from the right side to the left side and thereby guides the user to move the traced section in the left direction. Accordingly, the user is guided to move the traced section to the recommended position. The sensor 1 traces the traced section in accordance with an instruction of the control unit 21, and the input control device 2 determines whether the traced section moves to the recommended position of the home position based on the output of the sensor 1 (S604). In a case where the traced section does not reach the recommended position of the home position (No in S604), the tactile sensation presenting device 3 continues the presentation of the tactile sensation until the traced section reaches the recommended position of the home position (S603). In a case where the input control device 2 determines that the traced section reaches the recommended position of the home position (Yes in S604), the input control device 2 reconfigures the recommended position as the home position 24*a* (S605). The tactile sensation presenting device 3 presents the tactile sensation to the tactile sensation presenting section in accordance with an instruction of the control unit 21 and thereby indicates to the user that the home position 24*a* is reconfigured (S606). The control unit 21 of the input control device 2 again creates the coordinate association table 24 based on the reconfigured home position (S607).

Accordingly, even in a case where the home position 24*a* that is initially set is not an appropriate location, the user may reconfigure the home position 24*a* in an appropriate location by moving the traced section in accordance with the guidance of the gesture input system 100.

Third Embodiment

Figure 8:
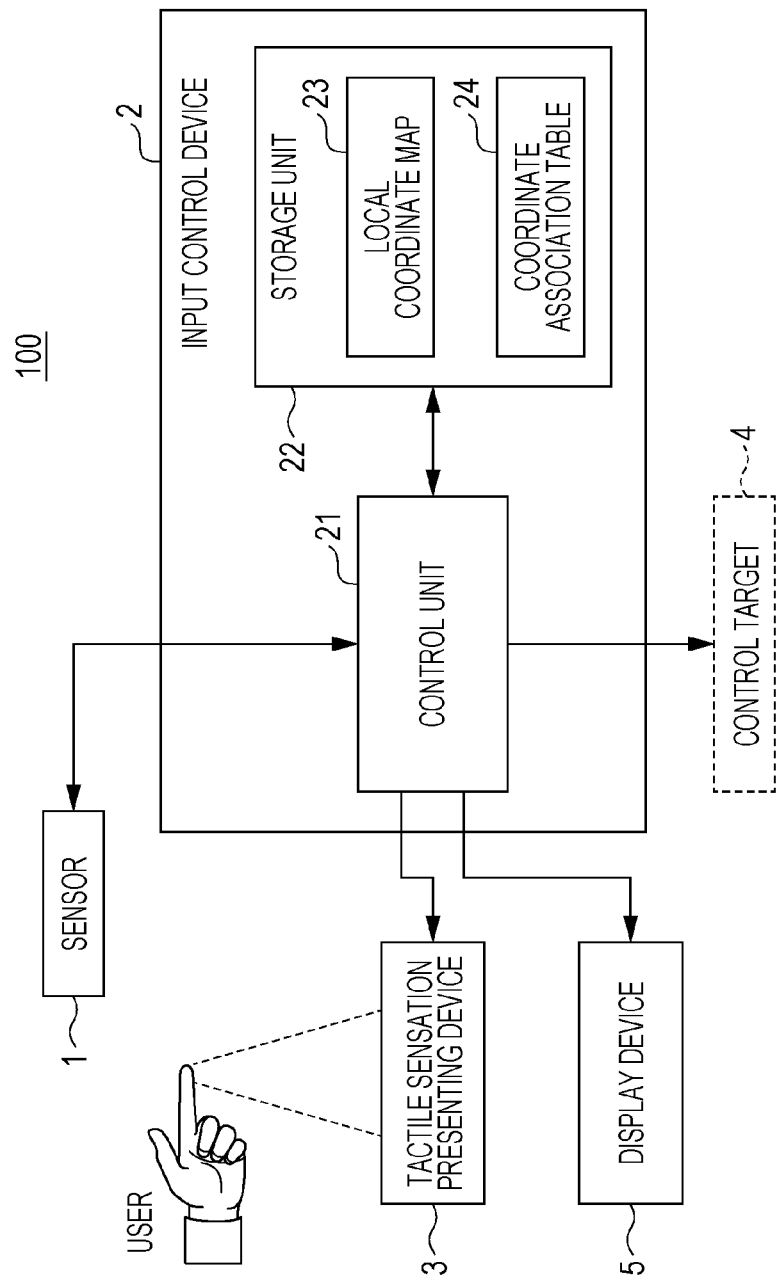
FIG. 8 is a block diagram that illustrates a configuration of a gesture input system according to a third embodiment.
Figure 9:
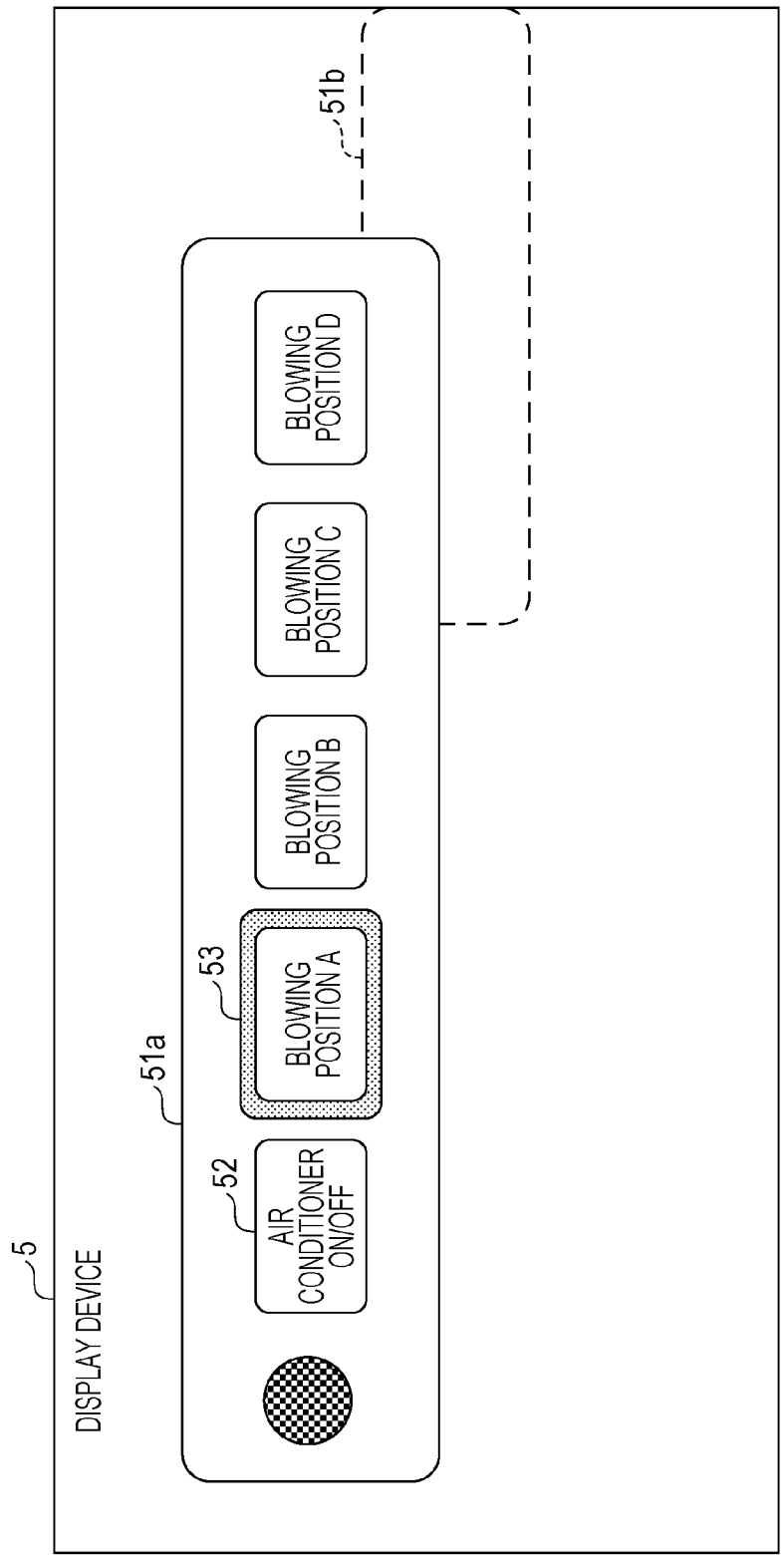
FIG. 9 is a diagram that illustrates a display example of a display device of the third embodiment.

FIG. 8 illustrates a configuration of the gesture input system 100 of a third embodiment of the present disclosure. The gesture input system 100 of this embodiment includes a display device 5 that displays images of the selectable parts 23*b*. The display device 5 visually assists the gesture input. The display device 5 is a head-up display (HUD), for example. FIG. 9 illustrates a display example of a screen of the display device 5. The display device 5 displays a map image 51*a* that indicates the selectable parts. The map image 51*a* corresponds to the local coordinate map 23 and indicates relative positions of the selectable parts 23*b* by icons 52.

Figure 10:
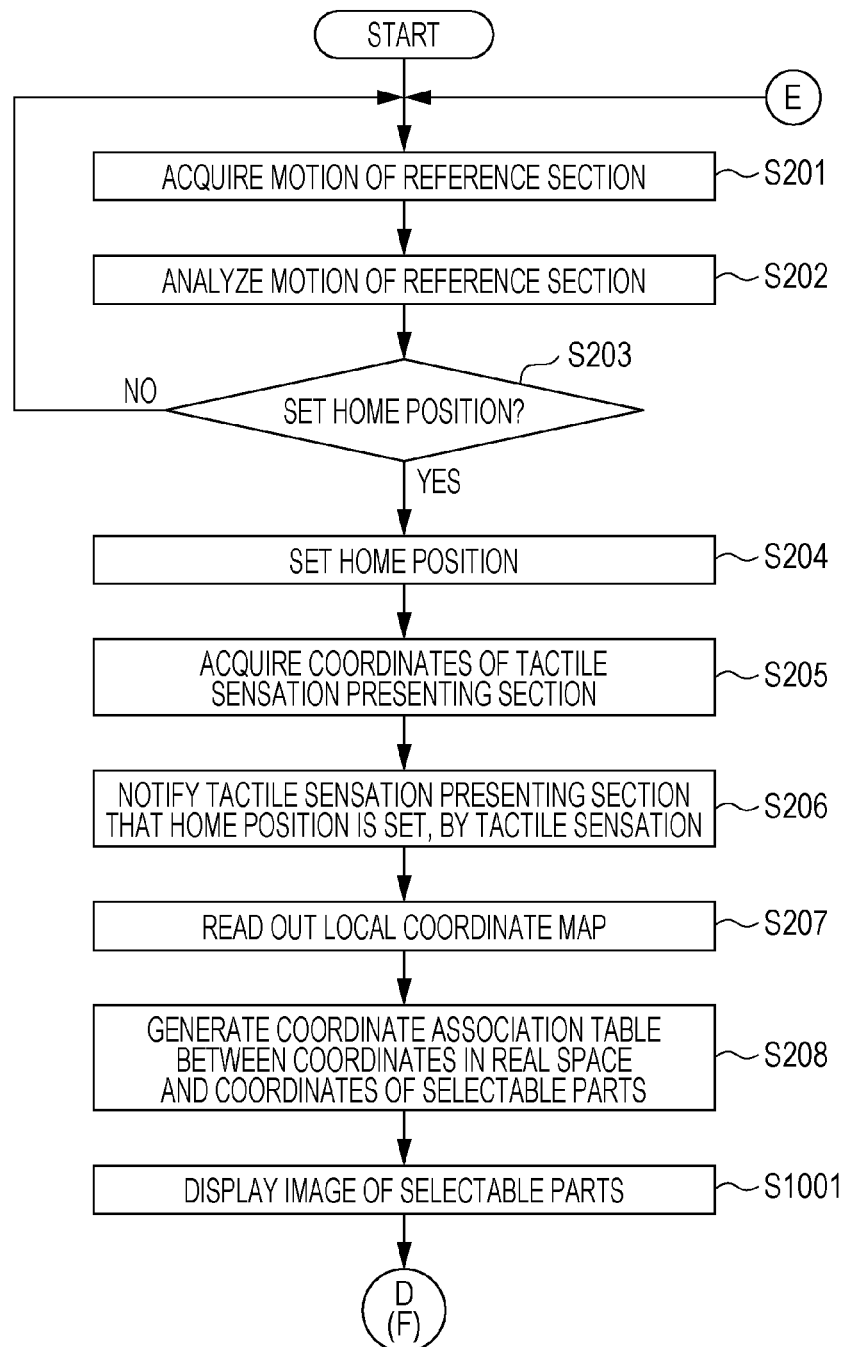
FIG. 10 is a flowchart that illustrates a gesture input method of the third embodiment.
Figure 11:
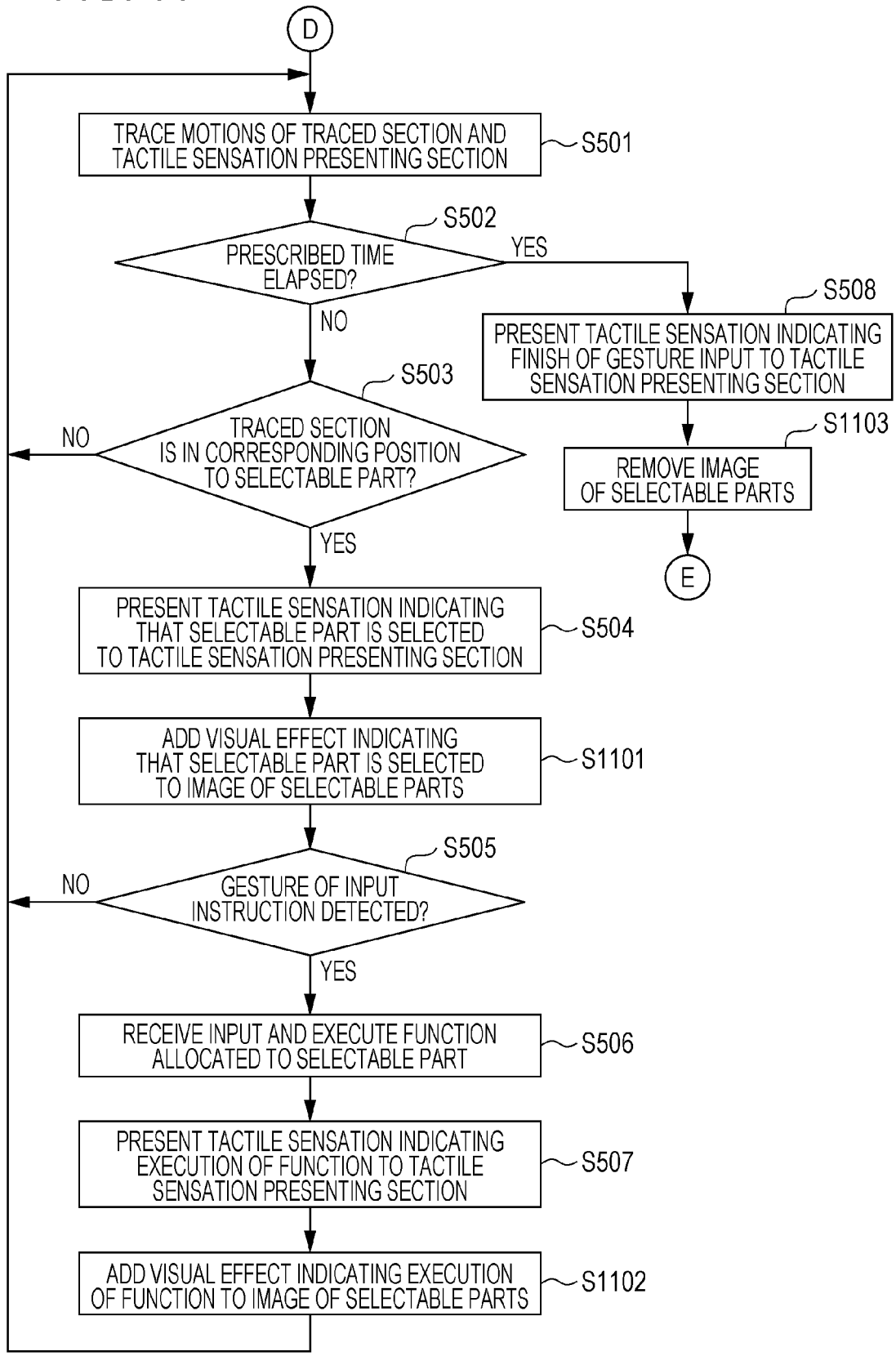
FIG. 11 is a flowchart that illustrates one example of the gesture input method of the third embodiment.
Figure 12:
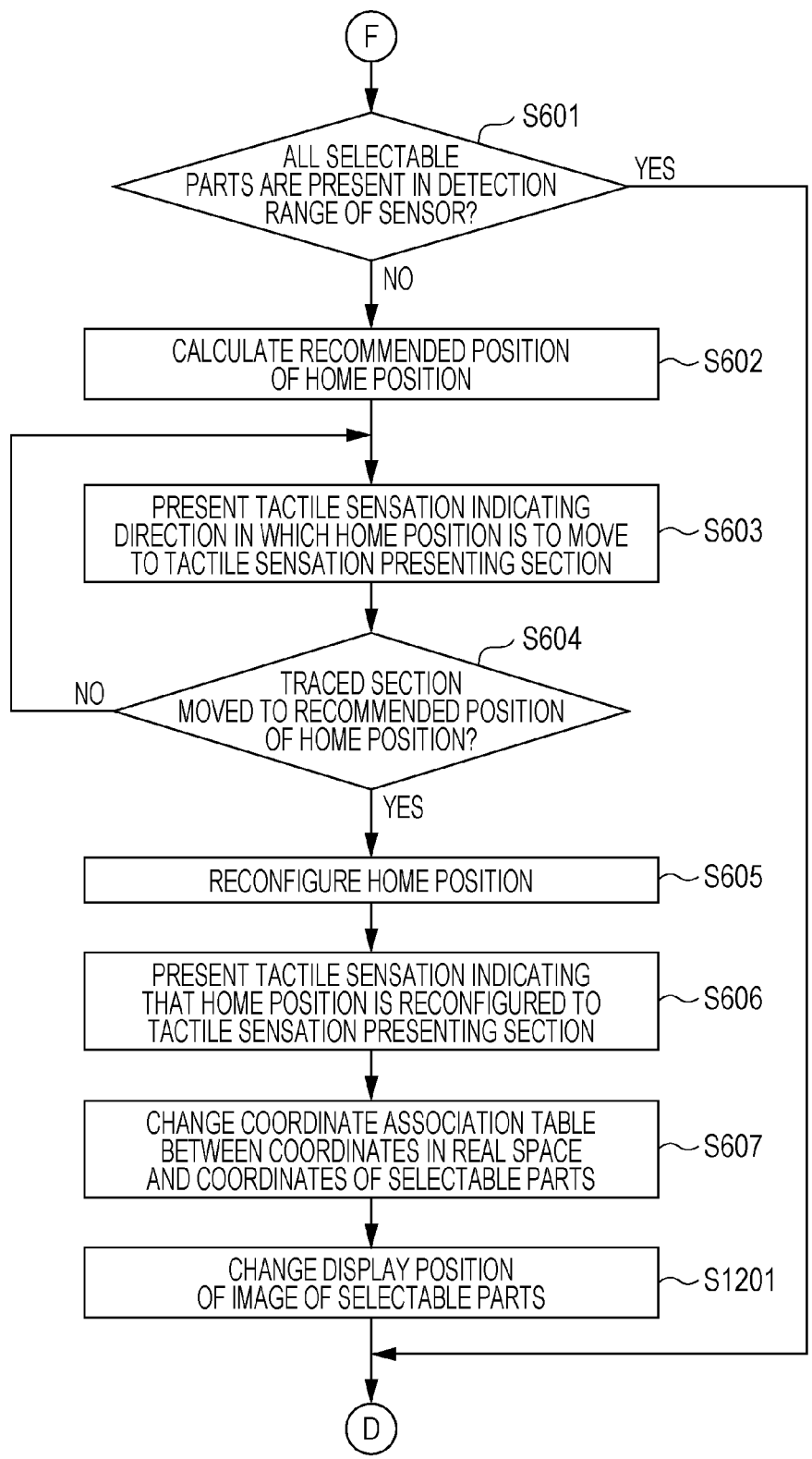
FIG. 12 is a flowchart that illustrates another example of the gesture input method of the third embodiment.

FIGS. 10 to 12 illustrate a gesture input method in this embodiment. FIG. 10 is the flow of FIG. 2 to which step S1001 about the display of the image of the selectable parts is added. In FIG. 10, each of the steps other than step S1001 is the same as FIG. 2. When the gesture input system 100 of this embodiment generates the coordinate association table 24 (S208), the gesture input system 100 displays the map image 51*a* that is illustrated in FIG. 9 to the display device 5 (S1001).

FIG. 11 is the flow of FIG. 5 to which steps S1101 to S1103 about the display of the image of the selectable parts are added. In a case where the control unit 21 of the input control device 2 determines that the traced section is in the position that corresponds to the selectable part (Yes in S503), the control unit 21 presents the tactile sensation to the tactile sensation presenting section via the tactile sensation presenting device 3 (S504) and presents a prescribed visual effect to the user via the display device 5 (S1101), and indicates to the user that the selectable part is selected by the tactile sensation and the sense of sight. For example, as illustrated in FIG. 9, a visual effect 53 is added to the selected icon 52. Accordingly, the user may recognize that the selectable part is selected. The visual effect 53 may be a visual effect by which selecting or not selecting of the selectable part may be distinguished. For example, the visual effect 53 may be a display in which the selected icon 52 is enlarged or may be a display in which the icon 52 shakes. Alternatively, the visual effect 53 may be a display in which the shape of the icon 52 is changed or may be a display in which the color of the icon 52 is changed. As described above, the gesture input system 100 of this embodiment notifies the user that the selectable part is selected by both of the tactile sensation and the sense of sight.

Further, in a case where the traced section is in the position that corresponds to the selectable part and where the prescribed gesture is detected (Yes in S505), the control unit 21 of the input control device 2 presents the tactile sensation to the tactile sensation presenting section via the tactile sensation presenting device 3 (S507), presents the prescribed visual effect to the user via the display device 5 (S1102), and thereby notifies the user that a function allocated to the selectable part is executed. For example, the visual effect may be a display in which the icon 52 is caused to blink. The visual effect that indicates that the selectable part is selected (S1101) and the visual effect that indicates that the function is executed (S1102) may be different from each other.

In a case where a prescribed time elapses after the traced section starts to be traced (Yes in S502), the waiting state for the gesture input is canceled, and the map image 51*a* is removed (S1103).

FIG. 12 is the flow of FIG. 6 to which step S1201 about the display of the image of the selectable parts is added. When the control unit 21 of the input control device 2 reconfigures the home position (S605), the control unit 21 changes the display position of the map image of the display device 5 in response to the position of the reconfigured home position. For example, in FIG. 9, in a case where the position of the home position is changed in the left direction, a map image 51*b* is changed to the map image 51*a*, and the display position of the map image thereby moves to the left side.

As described above, the gesture input system 100 of this embodiment displays the image of the selectable parts as assistance for the presentation of the tactile sensation via the display device 5. Accordingly, the user is enabled to perform an operation more accurately. Because the gesture input system 100 may notify the user of various kinds of information by the tactile sensation, the user may perform a desired input without watching the map image 51*a* of the display device 5.

The gesture input system 100 may provide a visual effect to the control target 4 itself, instead of or in addition to image display by the display device 5. For example, in a case where the control target 4 is an audio device, a button for volume adjustment of the audio device may be caused to flash.

Fourth Embodiment

Figure 13:
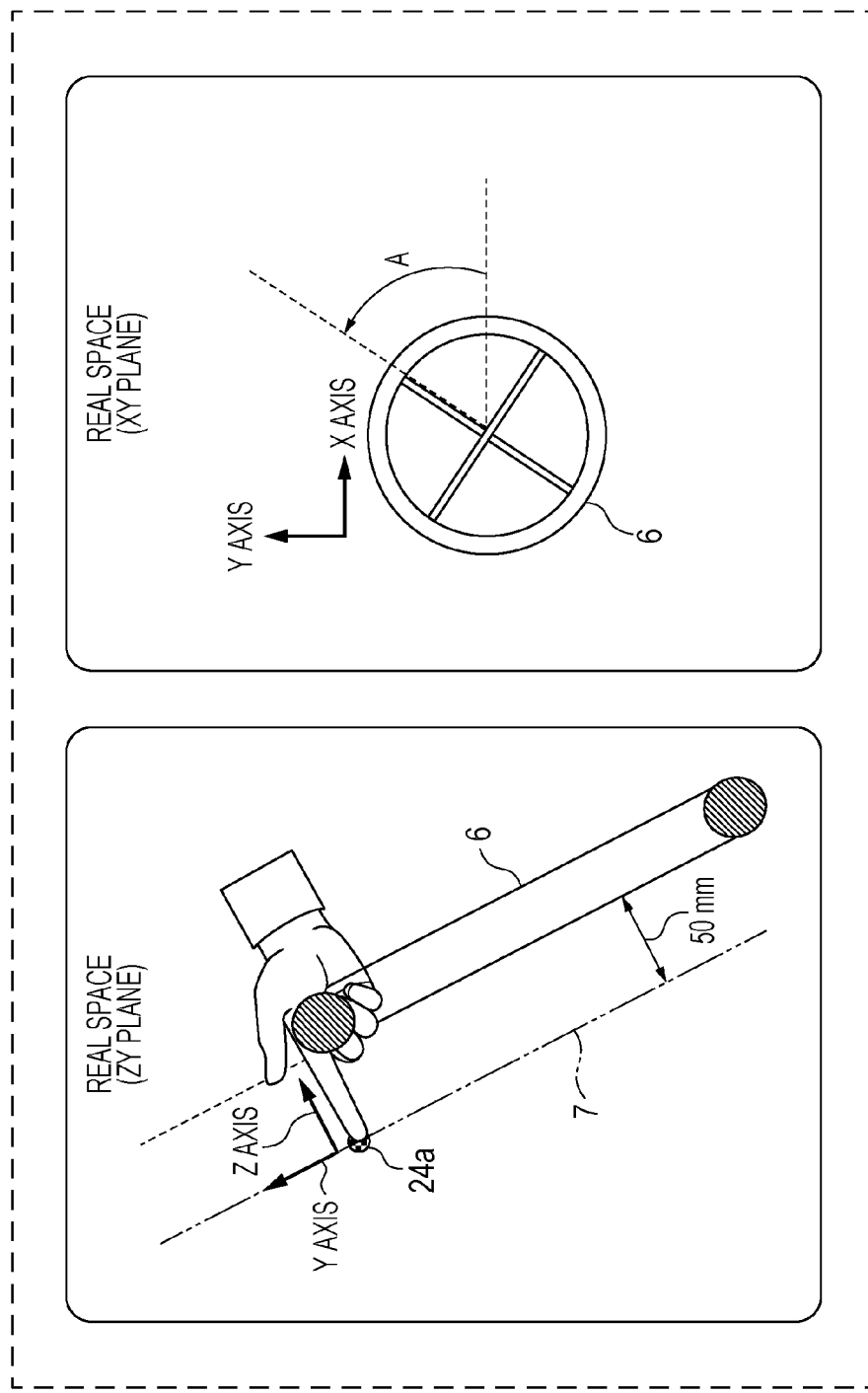
FIG. 13 is a diagram that illustrates an example where a gesture input system in a fourth embodiment is installed in a vehicle.

In this embodiment, a description will be made about an example where the gesture input system 100 and the control target 4 thereof are built in an automobile. FIG. 13 illustrates an example where the gesture input system 100 is installed in an automobile that includes a steering wheel 6.

The sensor 1 may be a sensor that employs a scheme referred to as "time of flight (TOF)", for example. This sensor 1 acquires depth information based on the time between projection of infrared rays to the body of the user and return of the infrared rays by reflection and thereby detects the motion of the user three-dimensionally. The sensor 1 is placed under a windshield in front of a driver seat, for example, in order to detect the motion of the hand of a driver. The sensor 1 detects the motion of the body of the user in a prescribed range from the steering wheel 6. For example, the sensor 1 is placed in a position where position information of the fingertip in a case where the driver raises the finger in a state where the driver grips the steering wheel 6 may be acquired.

The tactile sensation presenting device 3 includes the ultrasonic vibrator array that uses the acoustic radiation pressure of an ultrasonic wave. For example, in the ultrasonic vibrator array, 249 ultrasonic vibrators with a drive frequency of 40 kHz are arrayed in a lattice manner. The tactile sensation presenting device 3 individually drives each of the ultrasonic vibrators and thereby creates a focus of an ultrasonic wave in an arbitrary position in the air. Accordingly, an acoustic pressure with a magnitude that may not be output by a single ultrasonic vibrator may be formed in a focus spot. For example, 249 ultrasonic vibrators, each of which exhibits an output of less than 120 dB in a measurement distance of 300 mm in a case of being driven as a single ultrasonic vibrator, are prepared. Those ultrasonic vibrators are arrayed in a lattice manner such that the outputs form the focus in a location of 300 mm. In this case, an acoustic pressure level of 159 dB may be obtained in the focus spot. At the focus of an ultrasonic wave, a static pressure that is referred to as acoustic radiation pressure occurs, the static pressure is blocked by the surface of the body, and a force that pushes the body surface occurs. Accordingly, a pressure may be presented to the body in a contactless manner. In addition, the ultrasonic vibrators are intermittently driven to change the acoustic radiation pressure through time, and a vibration may thereby be presented to the user. For example, the ultrasonic vibrators are driven while an amplitude modulation of a square wave of 200 Hz is applied thereto, and a vibration may thereby be presented to the user. The ultrasonic vibrator array is placed on an upper surface of a steering column in order to present the tactile sensation to the fingertip of the driver who operates the steering wheel 6.

The gesture input system 100 is started when an engine of the automobile is driven. Accordingly, the sensor 1 starts acquiring the motion of the driver. In this embodiment, the fingertip of the right hand of the driver is detected as the reference section. In this embodiment, as the motion that is performed by the user to demonstrate the intention of requesting the setting of the home position, a motion in which the fingertip of the right hand as the reference section crosses a plane 7 that is separated by 50 mm from the steering wheel of the automobile is set in advance. Accordingly, the driver may express the intention of requesting the setting of the home position by raising one finger of the right hand while gripping the steering wheel 6 even during driving.

In a case where the control unit 21 detects via the sensor 1 that the fingertip of the index finger of the right hand crosses the plane 7 that is separated by 50 mm from the steering wheel 6 of the automobile, the control unit 21 sets the position (coordinates, for example) of the finger tip of the index finger of the right hand as the home position 24a and sets the position as the tactile sensation presenting section and the traced section.

The control unit 21 brings the focus of the ultrasonic wave from the tactile sensation presenting device 3 to the fingertip that is set as the home position 24a in order to notify the driver that the home position 24a is set. In this case, the tactile sensation presenting device 3 applies the amplitude modulation of 200 Hz to the ultrasonic wave. Accordingly, the driver may sense the vibration. Thus, the driver may recognize that the home position is set and the position of the home position by the tactile sensation independently from the sense of sight, the sense of hearing, or the sense of touch through a solid body.

The input control device 2 in advance stores the local coordinate map 23 illustrated in the upper part of FIG. 3 in the storage unit 22, for example. Alternatively, the input control device 2 generates the local coordinate map 23 and stores it in the storage unit 22 when the home position 24a is set. In this case, for example, functions of switching ON and OFF of an air conditioner which is built in the automobile and/or setting a blowing position of wind from the air conditioner is allocated to the selectable parts 23b that are disposed. After the home position 24a is set, the input control device 2 generates the coordinate association table 24 based on the set home position 24a. For example, the local coordinates of the local coordinate map 23 are set to be associated with the motion in the real space only in the X direction of the traced coordinate. Accordingly, the motions of the traced section in the real space in the Y direction and the Z direction are ignored, and only the motion of the traced section in the real space in the X direction is used as the motion in selection of the selectable part.

In a case where the fingertip of one finger of the right hand is the traced section, the sensor 1 traces the motion of the fingertip and acquires the coordinates of the fingertip. The input control device 2 refers to the coordinate association table 24 and calculates which position in the local coordinate map 23 the coordinates of the fingertip correspond to. When the fingertip reaches the position that corresponds to the selectable part 23b, the input control device 2 determines that the selectable part 23b is selected. Then, the tactile sensation presenting device 3 presents the tactile sensation to the fingertip and thereby notifies the driver that the selectable part 23b is selected. For example, in a case where the user performs a prescribed gesture, for example, a motion in which the user bends the fingertip and thereafter stretches it in a state where the selectable part 23b is selected, the input control device 2 executes the function allocated to the selectable part 23b. In addition, the tactile sensation presenting device 3 presents the tactile sensation to the fingertip and thereby notifies the user that the function is executed. The tactile sensation for indicating that the selectable part 23b is selected and the tactile sensation for indicating that an input instruction is received may be different from each other. For example, those tactile sensations may be made different by changing the modulation frequency of the ultrasonic wave. Alternatively, the tactile sensation presenting device 3 may intermittently perform the presentation of the tactile sensation. In a case where a state where the traced section is not in the position that corresponds to the selectable parts continues for a prescribed time, the input control device 2 may determine that the driver does not express the intention of an operation and may cancel the waiting state for the gesture input and then return to an action of monitoring the reference section.

This series of steps enables the user to perform the gesture input quickly and accurately independently from the sense of sight, the sense of hearing, or the sense of touch through a solid body. The gesture input system 100 of this embodiment enables the user to express the intention of requesting the setting of the home position 24a anywhere in the plane 7 that is separated by 50 mm from the steering wheel 6. Thus, the driver may set the home position 24a of the gesture input system 100 by raising one finger of the right hand while gripping the steering wheel 6 during driving, for example. Further, because the gesture input system 100 presents the setting of the home position 24a and reception of the gesture input to the user by the tactile sensation, the user does not have to watch the display device even while driving the automobile. Thus, the user (that is, the driver) may perform an input operation without lowering the concentration on driving. As described above, in this embodiment, the input operation may be intuitively executed without an action of searching for an operation position or large eye movement.

In a case where a steering angle A of the steering wheel 6 is larger than a prescribed angle, the input control device 2 may stop control based on the motions of the reference section and the traced section (control for setting the home position 24a, for example). Alternatively, in a case where the steering angle A of the steering wheel 6 is larger than the prescribed angle, the input control device 2 may cancel the home position 24a that is already set. Such stop or cancellation may cause the user not to perform the gesture input in a case where the automobile is running along a curve, for example, and may cause the user to perform safe driving.

Overview of Embodiments (1) A gesture input system of the present disclosure includes: a sensor that detects a motion of a reference section as a portion of a body of a user and a motion of a traced section as a portion of the body of the user; an input control device that sets a base point in a real space based on the motion of the reference section which is detected by the sensor and receives an input based on the motion of the traced section from the set base point as a reference; and a notification device that notifies a notified section as a portion of the body of the user of prescribed information in response to the input which is received by the input control device in a contactless manner, in which the input control device generates association information that indicates association between real coordinates and virtual coordinates which include at least one selectable part as a region for receiving a prescribed input based on the base point, associates the motion of the traced section in the real space that is detected by the sensor with an operation for the selectable part in the virtual space by referring to the association information, and receives a prescribed input based on the operation for the selectable part.

As described above, the virtual coordinates of the selectable part are associated with the real coordinates, and reception of an input based on a motion of the body is thereby enabled. Thus, the user may perform an input without touching an input unit such as a touch panel, for example. This enables a quick input. Further, because the prescribed information is notified to the notified section in response to the received input in a contactless manner, the user may accurately perform an input without watching a display unit, for example.

(2) In the gesture input system of (1), the input control device may determine whether or not the traced section that is detected by the sensor is in a position that corresponds to the selectable part by referring to the association information and may receive a prescribed input that corresponds to the selectable part in a case where a prescribed motion of the traced section is detected by the sensor when the traced section is in the position that corresponds to the selectable part.

Accordingly, the user may execute the prescribed input that corresponds to the selectable part by an operation in the real space and is thus enabled to perform a quick input.

(3) In the gesture input system of (2), the notification device may notify the notified section that the base point is set by the input control device and that the traced section that is detected by the sensor is in the position that corresponds to the selectable part in a contactless manner.

Accordingly, the user may accurately perform an input without watching the display unit, for example.

(4) In the gesture input system of any of (1) to (3), the input control device may set real coordinates of the traced section in a case where the reference section performs a prescribed motion as the base point.

Accordingly, the user may intuitively perform a gesture input by a motion of the body from the base point.

(5) In the gesture input system of any of (1) to (4), the input control device may decide virtual coordinates of the selectable part based on the base point in a case where the base point is set.

Accordingly, the selectable part may be arranged in response to the position of the set base point.

(6) In the gesture input system of any of (1) to (5), the association information may be a table or a function that associates the real coordinates and the virtual coordinates of the selectable part.

Accordingly, the selectable part in the virtual space may be selected by performing the gesture input in the real space.

(7) In the gesture input system of any of (1) to (6), the input control device may change the association between the real coordinates and the virtual coordinates of the selectable part in response to a movement velocity of the traced section.

Accordingly, operability in the gesture input is improved.

(8) In the gesture input system of any of (1) to (7), the input control device may determine whether coordinates of all the selectable parts in the virtual space may be associated with real coordinates of the traced section that may be detected in a detection range of the sensor based on the set base point and calculate a recommended position of the base point that enables association of the coordinates of all the selectable parts in the virtual space with the real coordinates of the traced section which may be detected in the detection range of the sensor in a case where the coordinates of all the selectable parts in the virtual space may not be associated with the real coordinates of the traced section that may be detected in the detection range of the sensor, the notification device may notify the notified section of a direction to the recommended position of the base point in a contactless manner until the traced section reaches the recommended position of the base point, and the input control device may reconfigure the recommended position of the base point as the base point in a case where the traced section reaches the recommended position of the base point.

Accordingly, all the selectable parts become selectable, and the operability in the gesture input is thus improved.

(9) In the gesture input system of any of (1) to (8), setting of the base point may be recalled in a case where a time in which the traced section is not in the position that corresponds to the selectable part exceeds a prescribed time.

Accordingly, the setting of the base point may be canceled in a case of accidentally setting the base point or the like.

(10) In the gesture input system of any of (1) to (9), at least two of the reference section, the traced section, and the notified section may be the same.

Accordingly, the user may intuitively perform the setting of the base point and the gesture input by the motion of the body from the base point.

(11) In the gesture input system of any of (1) to (10), the notification device may notify a portion of the body of the user that a prescribed input is received based on the operation for the selectable part.

Accordingly, the user may realize that control based on the gesture input is executed.

(12) The gesture input system of any of (1) to (11) may further include a display device that visually displays the selectable part while the base point is set.

Accordingly, the user is enabled to perform the gesture input more precisely.

(13) In the gesture input system of (12), the display device may add a visual effect that indicates that the selectable part is selected in a case where the traced section is in the position that corresponds to the selectable part.

Accordingly, the user is enabled to perform the gesture input more accurately.

(14) In the gesture input system of (12) or (13), the display device may add a visual effect that indicates that a prescribed input is received in a case where the prescribed input is received.

Accordingly, the user is enabled to perform the gesture input more accurately.

(15) In the gesture input system of any of (12) to (14), the display device may display the selectable part in a position based on the base point.

Accordingly, the user may understand a relative position in the real space of the selectable part that is set in the virtual space.

(16) In the gesture input system of any of (1) to (15), the notification device may perform notification by presenting a tactile sensation.

Accordingly, the user is enabled to perform a desired input operation accurately by depending on the tactile sensation.

(17) In the gesture input system of (16), the notification device may include plural ultrasonic vibrators and perform the notification by an acoustic radiation pressure that is output by the ultrasonic vibrators.

Accordingly, the user is enabled to perform a desired input operation accurately by depending on the tactile sensation.

(18) The gesture input system of any of (1) to (17) may be installed in an automobile that includes a steering wheel, in which the sensor may detect the motion of the body of the user in a prescribed range from the steering wheel.

Accordingly, the user may perform an input without releasing a hand from the steering wheel even while driving.

(19) In the gesture input system of (18), the input control device may stop control based on the motions of the reference section and the traced section that are detected by the sensor in a case where a steering angle of the steering wheel is greater than a prescribed angle.

Accordingly, for example, the gesture input may not be performed in a case where the automobile is running along a curve, for example, and safety during driving may thus be enhanced.

(20) A gesture input method of the present disclosure includes: a step of detecting a motion of a reference section as a portion of a body of a user; a step of setting a base point in a real space based on the detected motion of the reference section; a step of detecting a motion of a traced section as a portion of the body of the user; a step of receiving an input based on the motion of the traced section from the set base point as a reference; and a step of notifying a notified section as a portion of the body of the user of prescribed information in response to the received input in a contactless manner, in which in the step of receiving the input based on the motion of the traced section from the set base point as the reference, association information is generated which indicates association between real coordinates and virtual coordinates which include at least one selectable part as a region for receiving a prescribed input based on the base point, the detected motion of the traced section in the real space is associated with an operation for the selectable part in the virtual space by referring to the association information, and a prescribed input is received based on the operation for the selectable part.

As described above, the virtual coordinates of the selectable part are associated with the real coordinates, and reception of an input based on the motion of the body is thereby enabled. Thus, the user may perform an input without touching the input unit such as a touch panel, for example. This enables a quick input. Further, because the prescribed information is notified to the notified section in response to the received input in a contactless manner, the user may accurately perform an input without watching the display unit, for example.

The gesture input system and the gesture input method according to all the claims of the present disclosure are realized by cooperation or the like with hardware resources, for example, a processor and a memory, and a program.

The gesture input system of the present disclosure is useful as an input controller of a navigation device, an air conditioning device, and an audio device that are installed in an automobile, for example.

What is claimed is:

1. A system comprising:
    a sensor that detects motions of a first portion and a second portion of a body of a user in a real space;
    a memory that stores a map in which a position of a virtual object relative to a virtual base point is predetermined on a virtual coordinate system in a virtual space;
    a controller that:
        analyzes a motion of the first portion based on information from the sensor,
        determines whether the motion of the first portion matches a prescribed motion,
        sets a real base point at a first position where the second portion exists, when it is determined that the motion of the first portion matches the prescribed motion,
        sets, by making the set real base point correspond to the virtual base point, an association relationship between a real coordinate system of the real space and the virtual coordinate system of the virtual space,
        sets, based on the set association relationship and the map, a second position, which corresponds to the position of the virtual object, in the real space,
        determines whether the second portion is located at the second position, and
        receives an operation for the virtual object when it is determined that the second portion is located at the second position; and
    a notification device that contactlessly notifies a prescribed information to a third portion of the body.

2. The system according to claim 1,
wherein the notification device stimulates a cutaneous sensation of the third portion to provide a notification of the prescribed information.

3. The system according to claim 2,
wherein the notification device includes at least one selected from a group consisting of an ultrasonic vibrator, a Peltier element, a laser, an air cannon, and an infrared source.

4. The system according to claim 2,
wherein the notification device includes plural ultrasonic vibrators that provide an acoustic radiation pressure to the third portion.

5. The system according to claim 1,
wherein the notification device contactlessly notifies the third portion that the real base point is set.

6. The system according to claim 1,
wherein the notification device contactlessly notifies the third portion that the second portion is located at the second position.

7. The system according to claim 1,
wherein the association relationship is set as a table or a function.

8. The system according to claim 1,
wherein the controller further changes the association relationship in response to the motion of the second portion.

9. The system according to claim 8,
wherein the controller changes the association relationship in response to a movement velocity of the second portion.

10. The system according to claim 1,
wherein in the association relationship, coordinate positions of all objects in the virtual space respectively correspond to coordinate positions in the real space that is detectable by the sensor.

11. The system according to claim 1,
wherein the controller further calculates a recommended position to which the second portion is to move before the association relationship is set,
the notification device further contactlessly notifies the third portion of information of the recommended position, and
the controller sets the association relationship after the second portion moves to the recommended position.

12. The system according to claim 1,
wherein the controller recalls the association relationship when a time in which the position of the second portion in the real space does not correspond to the second position exceeds a prescribed time.

13. The system according to claim 1,
wherein at least two of the first portion, the second portion, and the third portion are the same portion of the body.

14. The system according to claim 1,
wherein the notification device further contactlessly notifies the third portion that the operation is received.

15. The system according to claim 1 further comprising:
a display that displays the virtual object after the association relationship is set.

16. The system according to claim 1,
wherein the system is installed in an automobile that includes a steering wheel, and
a detection region of the sensor is a prescribed range that extends from the steering wheel.

17. The system according to claim 16,
wherein the controller stops at least either one of setting of the association relationship and the operation for the virtual object when a steering angle of the steering wheel is greater than a prescribed angle.

18. The system according to claim 1,
wherein the position of the virtual object is spaced from the position of the virtual base point in the virtual space.

19. The system according to claim 1,
wherein the second portion and the third portion are the same portion of the body.

20. The system according to claim 19,
wherein the notification device stimulates a cutaneous sensation of the third portion located at the first position.

* * * * *